Feb. 13, 1962 H. J. CHALL ET AL 3,021,055

ZERO SETTING CONTROL MEANS

Filed Dec. 31, 1956 24 Sheets-Sheet 1

Feb. 13, 1962 H. J. CHALL ET AL 3,021,055

ZERO SETTING CONTROL MEANS

Filed Dec. 31, 1956 24 Sheets-Sheet 2

Feb. 13, 1962 H. J. CHALL ET AL 3,021,055

ZERO SETTING CONTROL MEANS

Filed Dec. 31, 1956 24 Sheets-Sheet 3

FIG. 3

| | | | | | | |
|---|---|---|---|---|---|---|
| 0 | | 2 | • | 3 | | 5 |
| 1 | 1 | 2 | • | 3 | | 5 |
| 2 | 1 | 2 | • | | | 5 |
| 3 OR E | 1 | | • | | | |
| 4 | | 2 | • | | 4 | |
| 5 | | | • | | | 5 |
| 6 | 1 | | • | 3 | | 5 |
| 7 | 1 | 2 | • | 3 | | |
| 8 | | 2 | • | 3 | | |
| 9 | | | • | | 4 | 5 |
| LTRS. | 1 | 2 | • | 3 | 4 | 5 |
| CR | | | • | | 4 | |
| LF | | 2 | • | | | |
| FIGS | 1 | 2 | • | | 4 | 5 |
| STOP | 1 | 2 | • | 3 | 4 | |
| SPACE | | | • | 3 | | |
| TAB | 1 | | • | | 4 | |

Feb. 13, 1962 H. J. CHALL ET AL 3,021,055

ZERO SETTING CONTROL MEANS

Filed Dec. 31, 1956 24 Sheets-Sheet 4

ZERO SETTING CONTROL MEANS

Feb. 13, 1962 H. J. CHALL ET AL 3,021,055

ZERO SETTING CONTROL MEANS

Filed Dec. 31, 1956 24 Sheets-Sheet 6

Feb. 13, 1962 H. J. CHALL ET AL 3,021,055

ZERO SETTING CONTROL MEANS

Filed Dec. 31, 1956 24 Sheets-Sheet 9

Feb. 13, 1962 H. J. CHALL ET AL 3,021,055

ZERO SETTING CONTROL MEANS

Filed Dec. 31, 1956 24 Sheets-Sheet 11

Feb. 13, 1962 H. J. CHALL ET AL 3,021,055

ZERO SETTING CONTROL MEANS

Filed Dec. 31, 1956 24 Sheets-Sheet 12

Feb. 13, 1962 H. J. CHALL ET AL 3,021,055

ZERO SETTING CONTROL MEANS

Filed Dec. 31, 1956 24 Sheets-Sheet 13

Feb. 13, 1962 H. J. CHALL ET AL 3,021,055

ZERO SETTING CONTROL MEANS

Filed Dec. 31, 1956 24 Sheets-Sheet 14

ZERO SETTING CONTROL MEANS

Feb. 13, 1962    H. J. CHALL ET AL    3,021,055

ZERO SETTING CONTROL MEANS

Filed Dec. 31, 1956    24 Sheets-Sheet 17

Feb. 13, 1962 H. J. CHALL ET AL 3,021,055

ZERO SETTING CONTROL MEANS

Filed Dec. 31, 1956 24 Sheets-Sheet 19

Feb. 13, 1962 H. J. CHALL ET AL 3,021,055

ZERO SETTING CONTROL MEANS

Filed Dec. 31, 1956 24 Sheets-Sheet 20

Feb. 13, 1962 H. J. CHALL ET AL 3,021,055

ZERO SETTING CONTROL MEANS

Filed Dec. 31, 1956 24 Sheets-Sheet 22

Feb. 13, 1962 H. J. CHALL ET AL 3,021,055

ZERO SETTING CONTROL MEANS

Filed Dec. 31, 1956 24 Sheets-Sheet 23

Feb. 13, 1962 H. J. CHALL ET AL 3,021,055

ZERO SETTING CONTROL MEANS

Filed Dec. 31, 1956 24 Sheets-Sheet 24

United States Patent Office 3,021,055

Patented Feb. 13, 1962

3,021,055

ZERO SETTING CONTROL MEANS

Harold J. Chall, Castro Valley, and Russell K. Brunner, Cupertino, Calif., assignors to Friden, Inc., a corporation of California Filed Dec. 31, 1956, Ser. No. 631,834
6 Claims. (Cl. 235—60.4)

This invention relates to a recording calculator comprising an adding machine and a record making apparatus.

The object of the invention is to provide an improved recording calculator operable to make records of values put into, or developed in, the adding machine portion of the apparatus.

The adding machine portion of the apparatus, in accordance with this invention, has means for selectively entering in column positions values of "0" or higher denomination as required.

The feature of the invention resides in the provision of means in the apparatus for controlling the recording of zeros preceding or following figures of higher denomination, in the amounts entered or developed in the adding machine portion of the apparatus.

The invention is applicable, but not limited, to an Add Punch apparatus comprising an adding machine and a tape perforator and is hereinafter disclosed in an apparatus of such character.

This invention, inasmuch as it provides a means for selectively controlling the recording of zeros in the operation of the Add Punch apparatus, is of particular value in preparing perforated records suitable for controlling the recording of "0" or higher numerical values in particular columnar positions in a record sheet. For example, if the value "129" were required to be entered in the last three ordinal positions in a column of five ordinal positions, it might be of advantage to record on the record sheet the value "00129." The recording of the first "0" is in the fifth position, the second "0" is in the fourth position and the value "1" is in the third position. If the value "129" were required to appear in the fourth, third and second position, the value would be recorded as "01290."

The tape prepared by the apparatus of this invention has been found very useful in preparing so-called Hollerith punch cards in which the spaces for recording identification numbers and numerical values are very narrow and limited in number and where means are required for accurately stepping a card to the position in which the perforation for indicating a "0" or numerical value will appear in the required column.

In the drawings:

FIG. 3 shows a code record strip representing positions on a tape to be perforated in accordance with a required code record of the operation of the apparatus in combination;

The Add Punch machine embodying this invention is operable to list items entered in the adding machine, compute amounts therefrom, print required totals and make a perforated record of the required amounts, and is an improvement over the Add Punch apparatus described in the Harold J. Chall et al. application, S.N. 469,128, filed November 16, 1954, Patent No. 2,861,739, issued November 25, 1958, entitled "Perforated Record Making Adding Machine," and assigned to the same assignee as the present application. The improvement in the present application provides means for selectively controlling the recording in the tape, of perforations representing zeros required to appear before figures of higher value and required to be printed by a tape controlled printing apparatus subsequently placed under the control of the perforated tape made in the Add Punch of the present invention.

Figure 1:
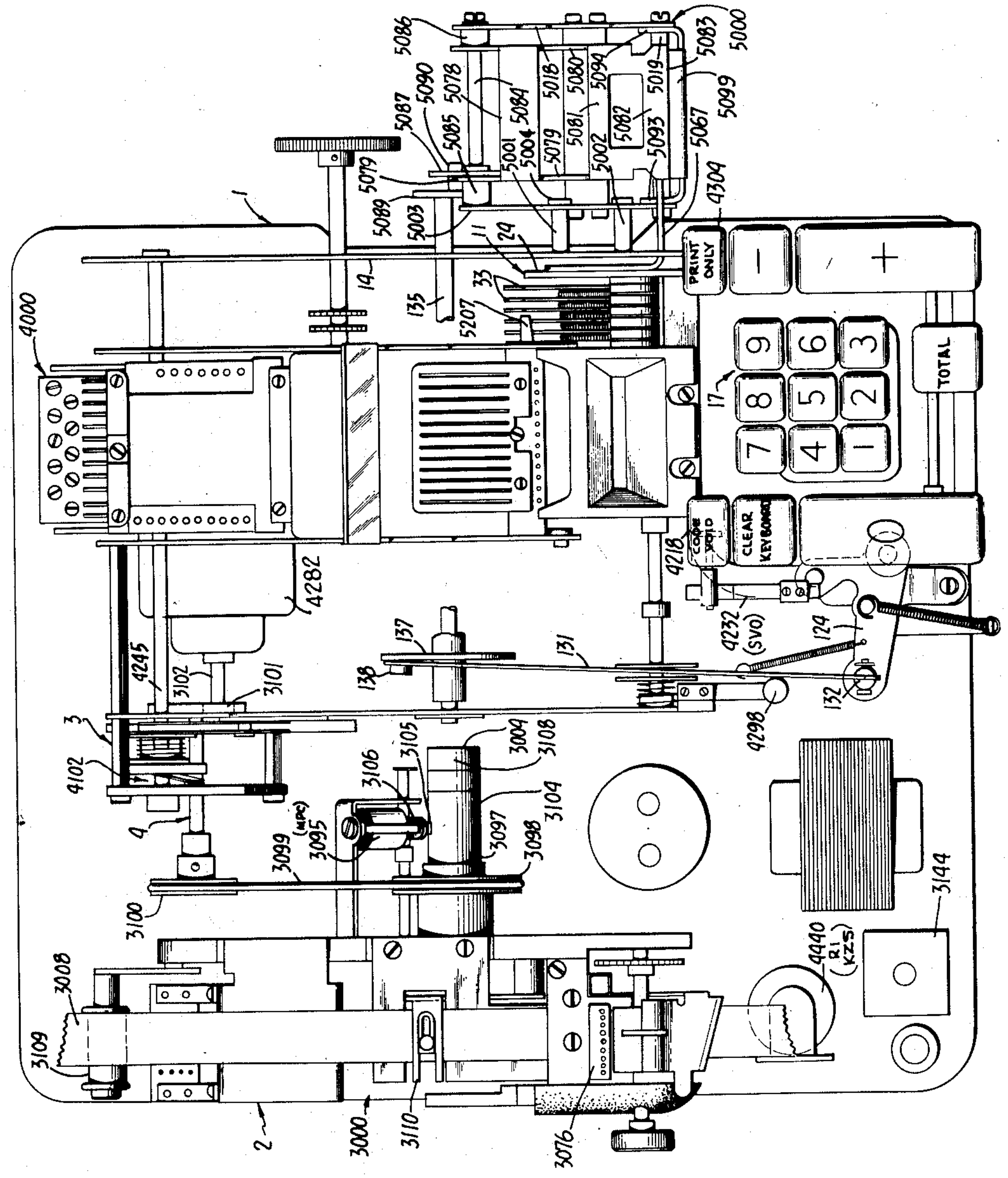
FIG. 1 is a top plan view, showing in combination a ten-key adding machine and a tape perforating apparatus and including this invention.

As shown in FIG. 1, this apparatus is a ten-key adding machine 1 and a tape perforator machine 2, the adding machine and the tape perforator being disposed in side-by-side spaced relation and being electrically and mechanically coupled through an electrical system, a commutator switch 3 and a power transmitting shaft 4.

The adding machine 1 is operable to receive and record entries of values such as are normally received and recorded by a record printing adding machine and to compute from these entries the sums or differences in the individual amounts entered and to record the totals as required.

The tape perforator 2 is operable to make perforated records in a tape and electromagnetic devices are provided in the tape perforator 2 to control the pattern of perforations made in the tape in accordance with signals coming into the tape perforator from some remote point, such, for example, as the electrical control system involving the commutator 3 and the electrical readout switch 4000 provided in the adding machine 1. The readout switch 4000 is operable to, in effect, electrically record the amounts computed in the adding machine 1.

Figure 2:
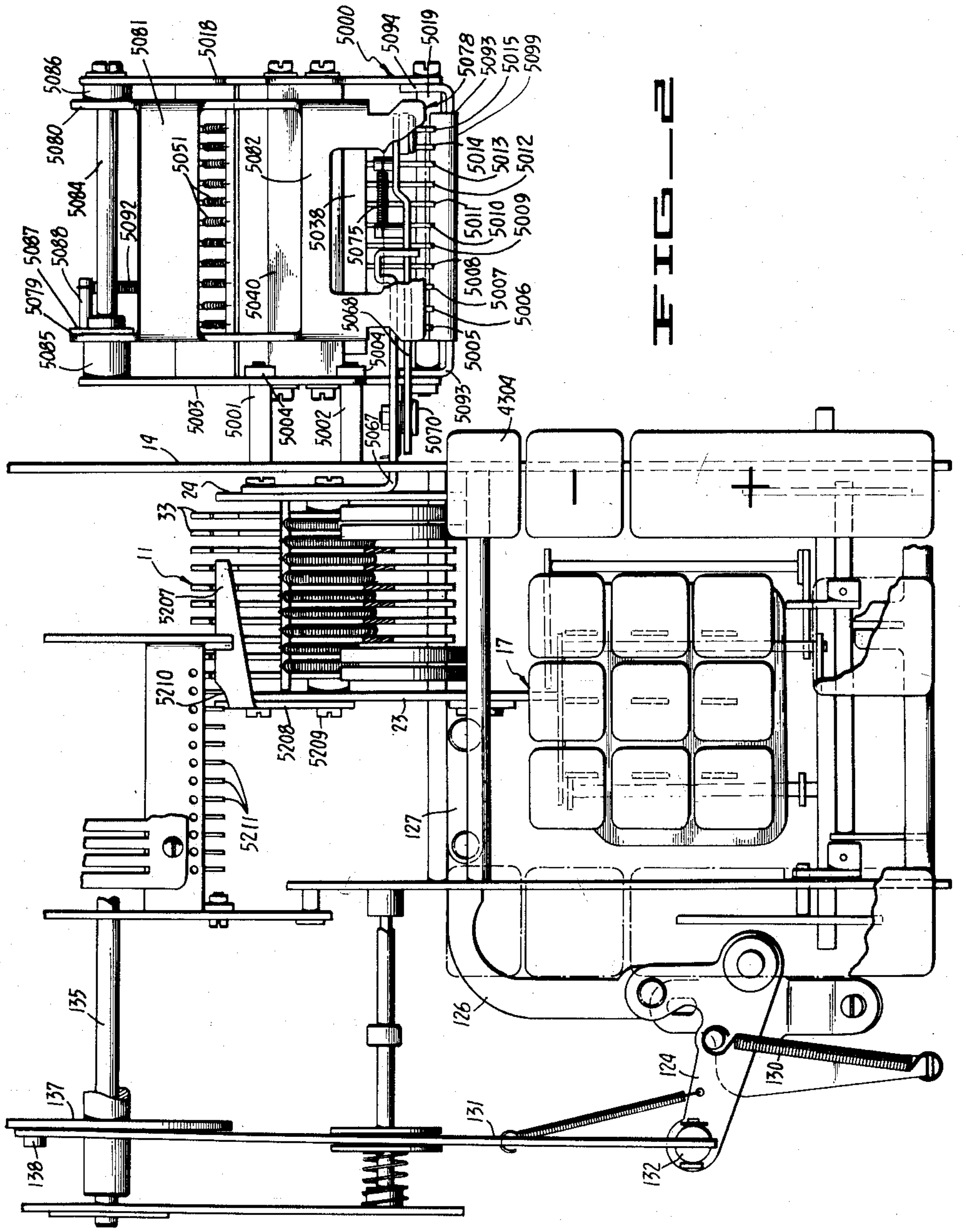
FIG. 2 is an enlarged view of a portion of the adding machine portion of the apparatus shown in FIG. 1.
Figure 9:
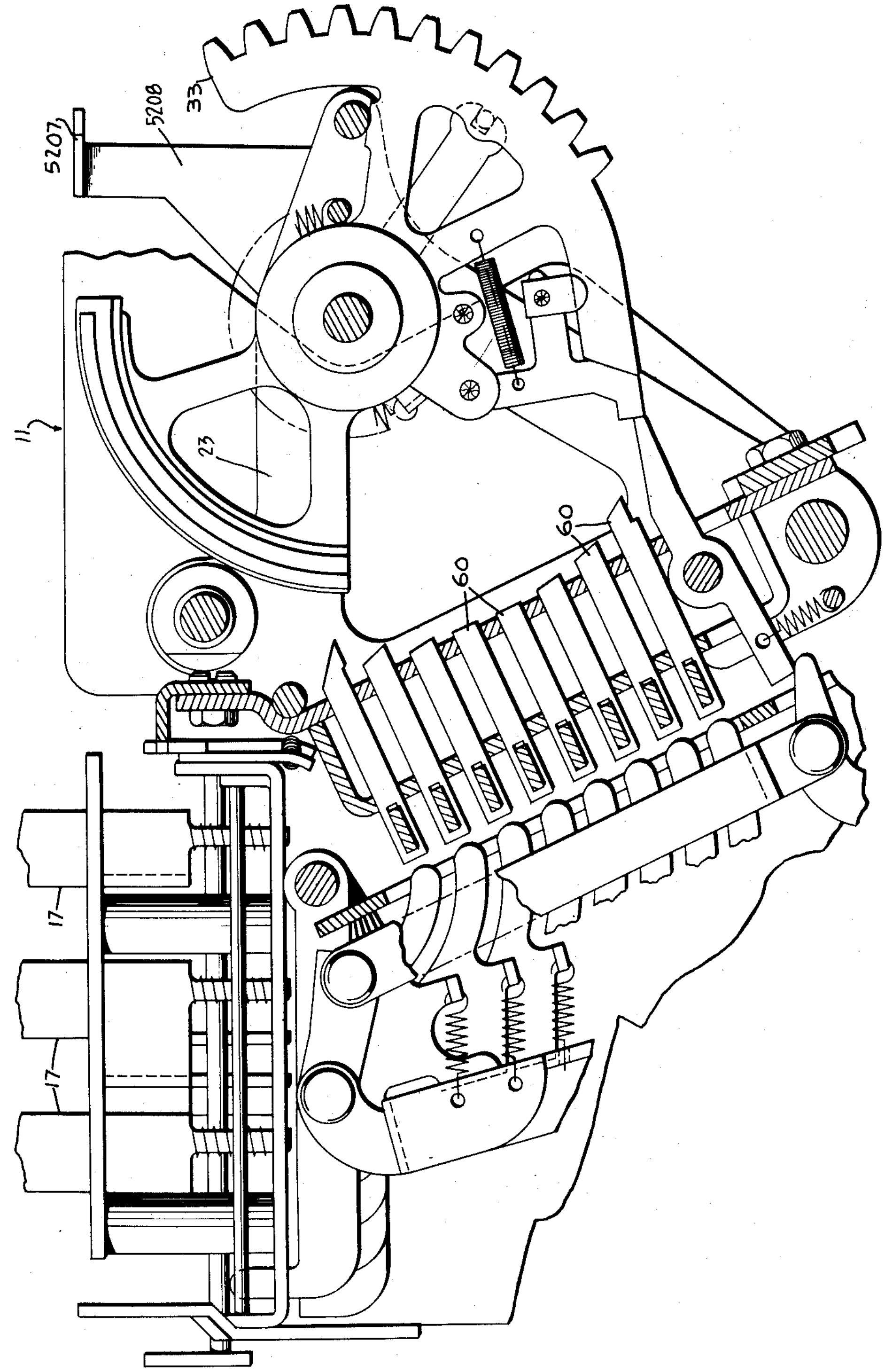
FIG. 9 is a view, partly in section, of a digitation mechanism employed in the adding machine apparatus.
Figure 14:
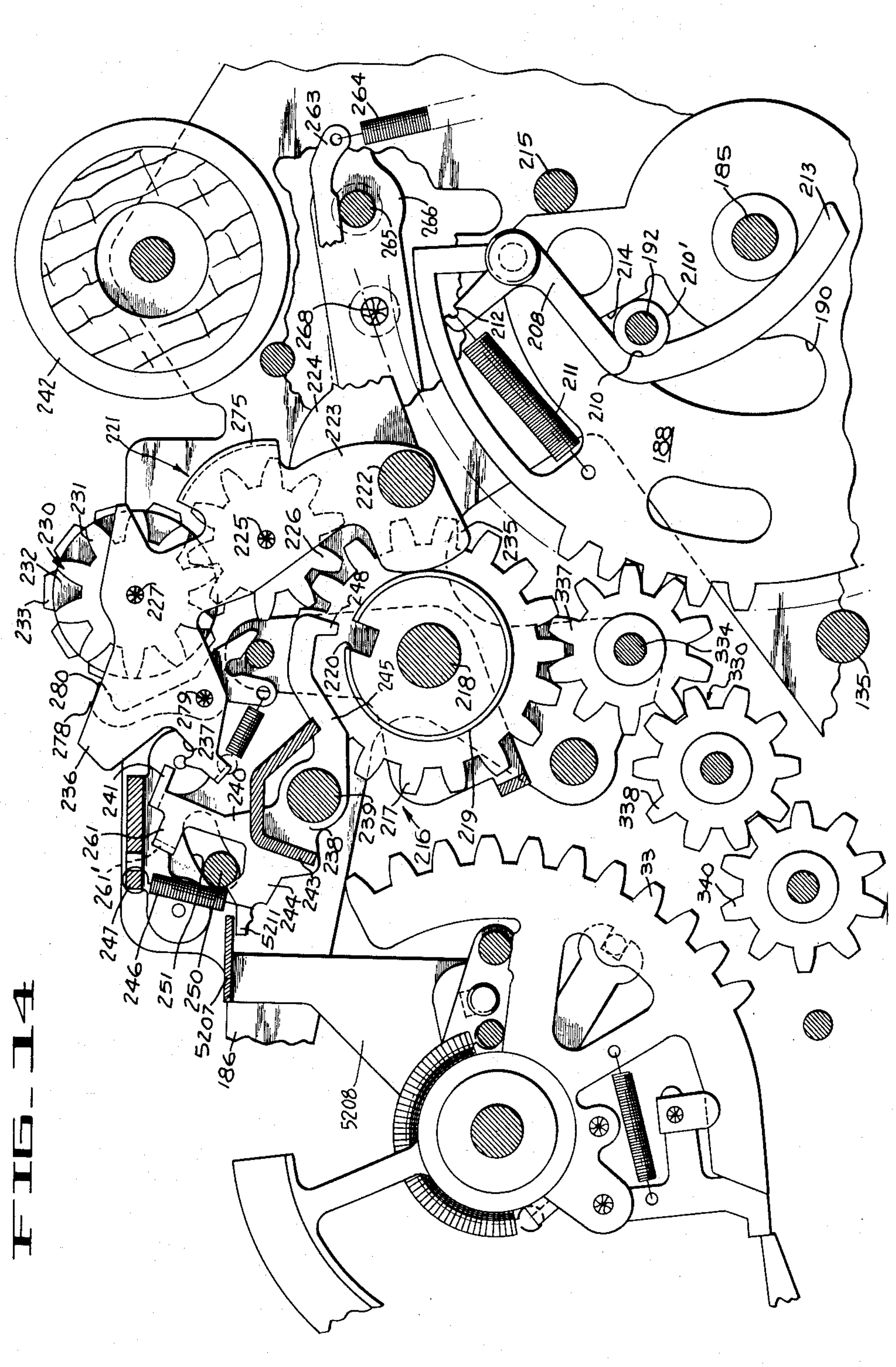
FIG. 14 is an enlarged side view, partly in section, of portions of the printing mechanism and the zero foil mechanism.

Referring to FIGS. 1, 2 and 9, respectively, it will be seen that when keys in the selection mechanism and involving the keys 17, for example, are manually operated in the keyboard assembly 10, pin setting bellcrank levers 66 are operated to operate a stop pin assembly to set, for example, the stop pins 60 to extend beyond their normal position, as shown in FIG. 9. By selective operation of the pins 60, sector gears 33 are controlled in their clockwise rotative movement to rotate to a required extent in accordance with the setting of the digital mechanism involving the key 17. During the rotation of the sector gears 33 back to their normal positions, a set of gears 337, 338 and 340, shown in FIG. 14, are brought into gear connection with the sector gears 33 to transmit movements of the sector gears 33 to a set of corresponding sector gears 188 to move the gears 188 to the same extent as the gears 33 were initially moved. The set of gears 337, 338 and 340 are subsequently pivotally moved to gear connect the sector gears 188 to a set of gears in an accumulator, not shown but operable to store, in effect, settings of the sector gears 188 and therefore hold in storage values after the sector gears 188 have been restored to normal position. By suitable operation of the gears 337, 338 and 340, the movements of the sector gears 33 may be gear transmitted to the sector gears 188 and movements of the sector gears 188 may be transmitted through the gear systems involving the gears 337, 338 and 340 to the accumulator. Also by operation of the gears 337, 338 and 340 in the required manner, rotations of the gears in the accumulator may be subsequently transmitted from the accumulator to the sector gears 188 so that the sector gears 188 may be operated to an extent required to represent an amount stored in the accumulator.

Figure 24:
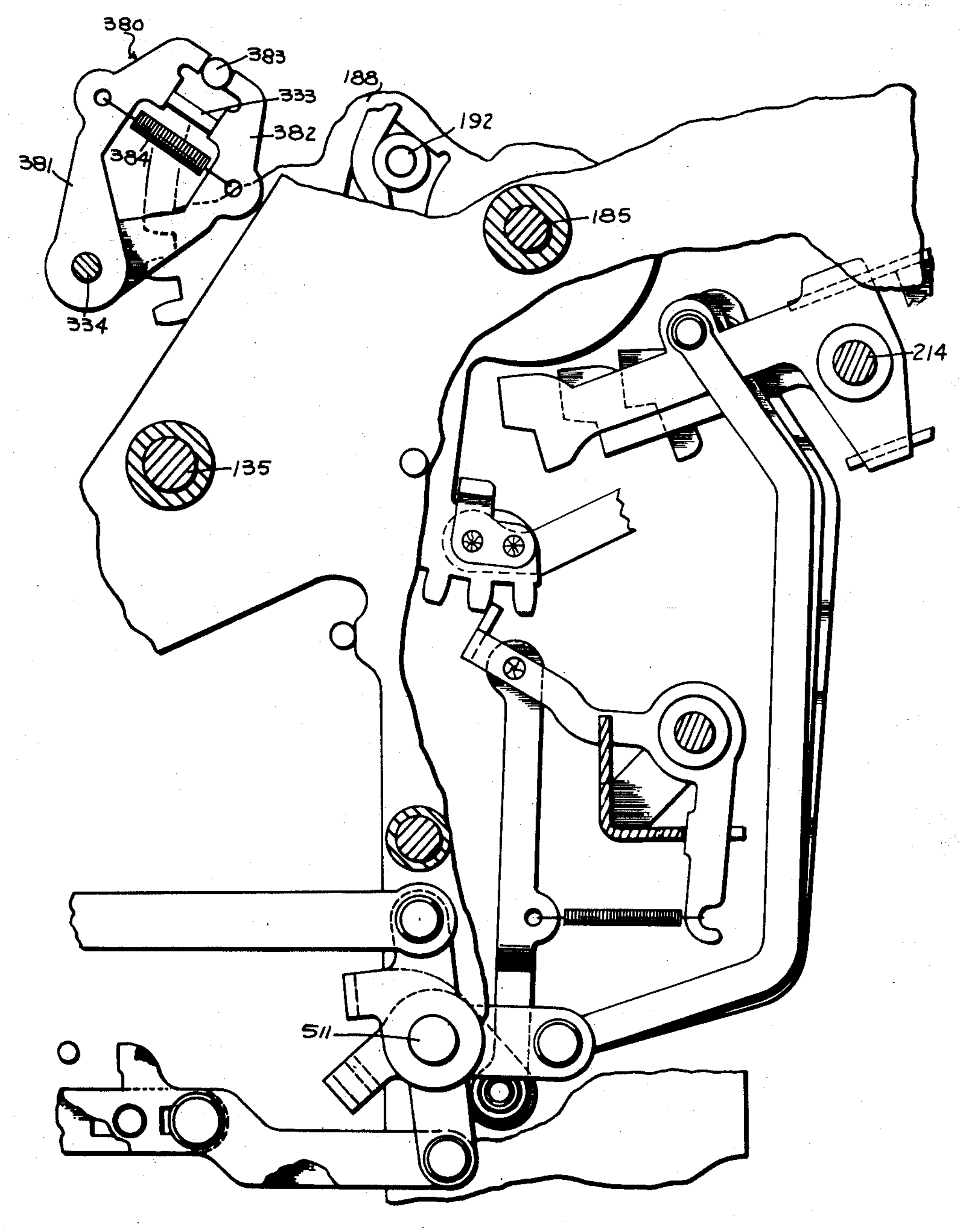
FIG. 24 is a right side view, partly in section, of a portion of the Add Punch apparatus showing the symbol mechanism.

The mechanism which resiliently urges the pendent transmission gear mechanism 330, FIG. 14, to its neutral position in which its gears 340 are clear of both the selector sectors 33 and the accumulator drive gears, is illustrated in FIG. 24 and generally indicated at 380. This mechanism comprises a pair of opposed jaws 381 and 382 pivotally mounted at corresponding ends on one end of the positive transmission gear shaft 334 and extending from the shaft 334 past the respectively opposite edges of the transmission shifting element 333 of the positive transmission cage. A stop pin 383 is disposed between the free ends of the jaws 381 and 382 and a tension spring 384 connected between the jaws at a location between the gear shaft and the element 333 resiliently urges the jaws toward each other and the free ends of the jaws against the stop pin 383 to hold the element 333 in its centered or neutral position. When the shifting element 333 is moved to one side or the other in consequence of rocking movement of the positive gear transmission mechanism in one direction or the other from its neutral position, the corresponding jaw 381 or 382 is forced away from the stop pin 383 tensioning the spring 384 which then resiliently urges the jaw back to its position at rest against the stop pin 383 and urges the shifting element 333 back to its position corresponding to the neutral position of the transmission gear mechanism.

LOCKING MECHANISM FOR POSITIVE GEAR TRANSMISSION, FIG. 25

Figure 12:
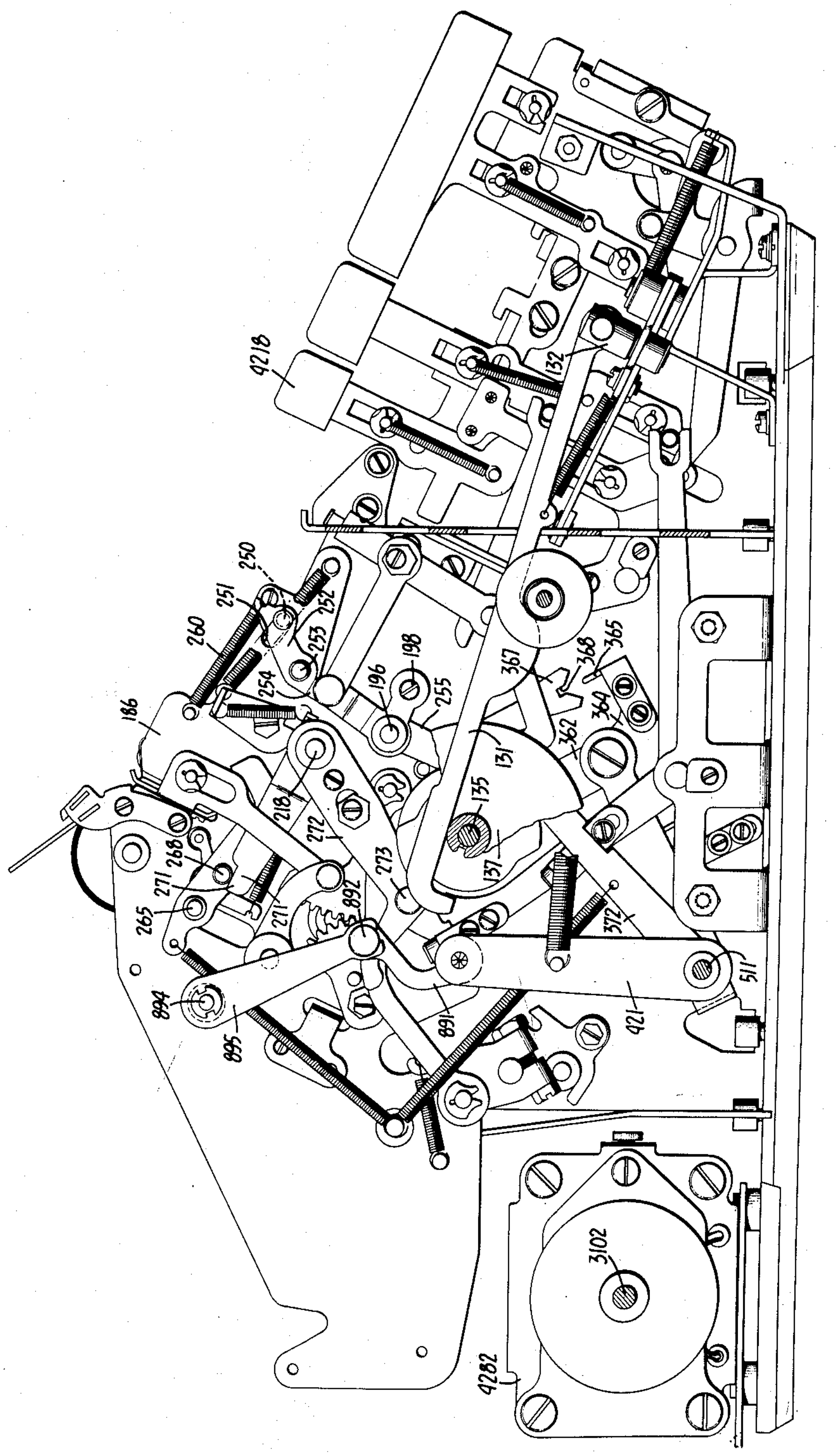
FIG. 12 is a left side elevational view of the Add Punch machine and with the cover removed.
Figure 25:
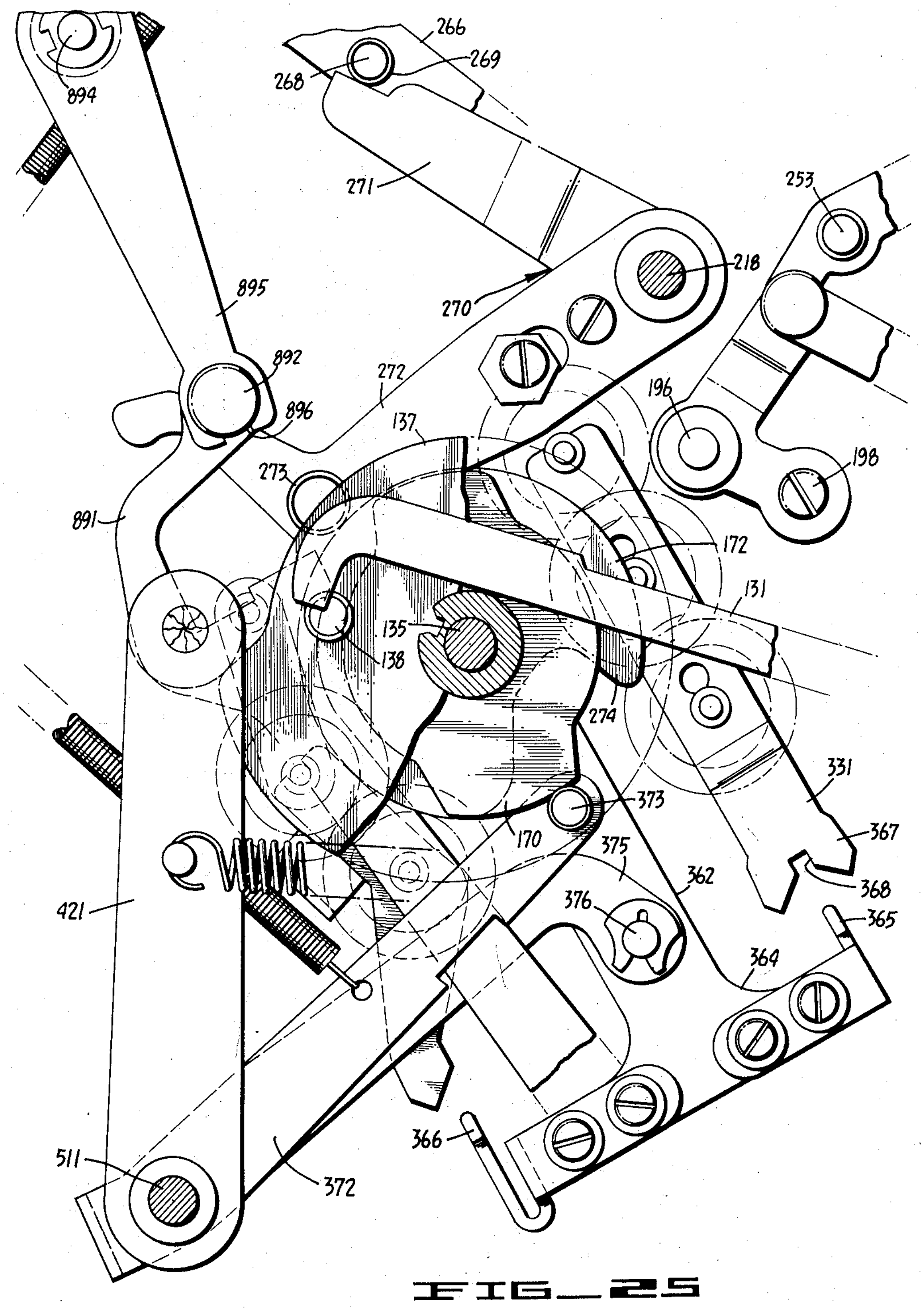
FIG. 25 is an elevational view from the left-hand side of the adding machine showing the crank for operating the return mechanism of the shiftable selector unit, the positive and negative transmission gear locking cam, the crank pin for releasing the control keys at the left-hand side of the keyboard and the print controlling cam, together with the mechanisms operated by the several cams.

The mechanism for locking the positive gear transmission mechanism 330 in each of its three positions, that is, its position in which its gears 340, FIG. 14, are in mesh with the selector gear teeth, its neutral position, and its position in which its gears 340 are in mesh with the accumulator drive gears, comprises a T-shaped locking bar 362, as shown in FIGS. 25 and 12, respectively, which inclines downwardly and forwardly from the cam shaft 135. The upper end of the bar 362 is notched out to slidably receive the cam shaft 135. A cross-head 364 on the lower end of the bar extends perpendicularly to opposite sides of the bar 362 and carries at its ends detents 365 and 366 which are directed from the crosshead back along the bar 362 toward the cam shaft 135. The leg 331 of the cage of the transmission gear mechanism, is provided on its free end with a formation 367 of slightly increased width in which a notch 368 is formed to accommodate the detent 365. The portions of the formation, in which the notch is provided, have inclined edges for camming the detent 365 into the notch.

A cam following rocker arm 372 is mounted at its lower end on the rocker arm pivot shaft 511 and carries on its upper end a cam following roller 373 which rides on the peripheral edge of the transmission locking cam 170. A second lever arm 375, disposed in spaced and almost parallel relationship to the lever arm 372, is also pivotally mounted at its lower end on the shaft 511 and is pivotally connected at its upper end to the slide or locking bar 362 by a suitable pivotal connection 376. The lever arm 372 is drivingly connected to the lever arm 375 in a manner to permit the upper end of the lever arm 375 to follow the rectilinear movement of the locking bar 362 and a suitable spring, connected between the machine frame and the lever 372, maintains the cam following roller 373 against the peripheral edge of the cam 170.

Figure 15:
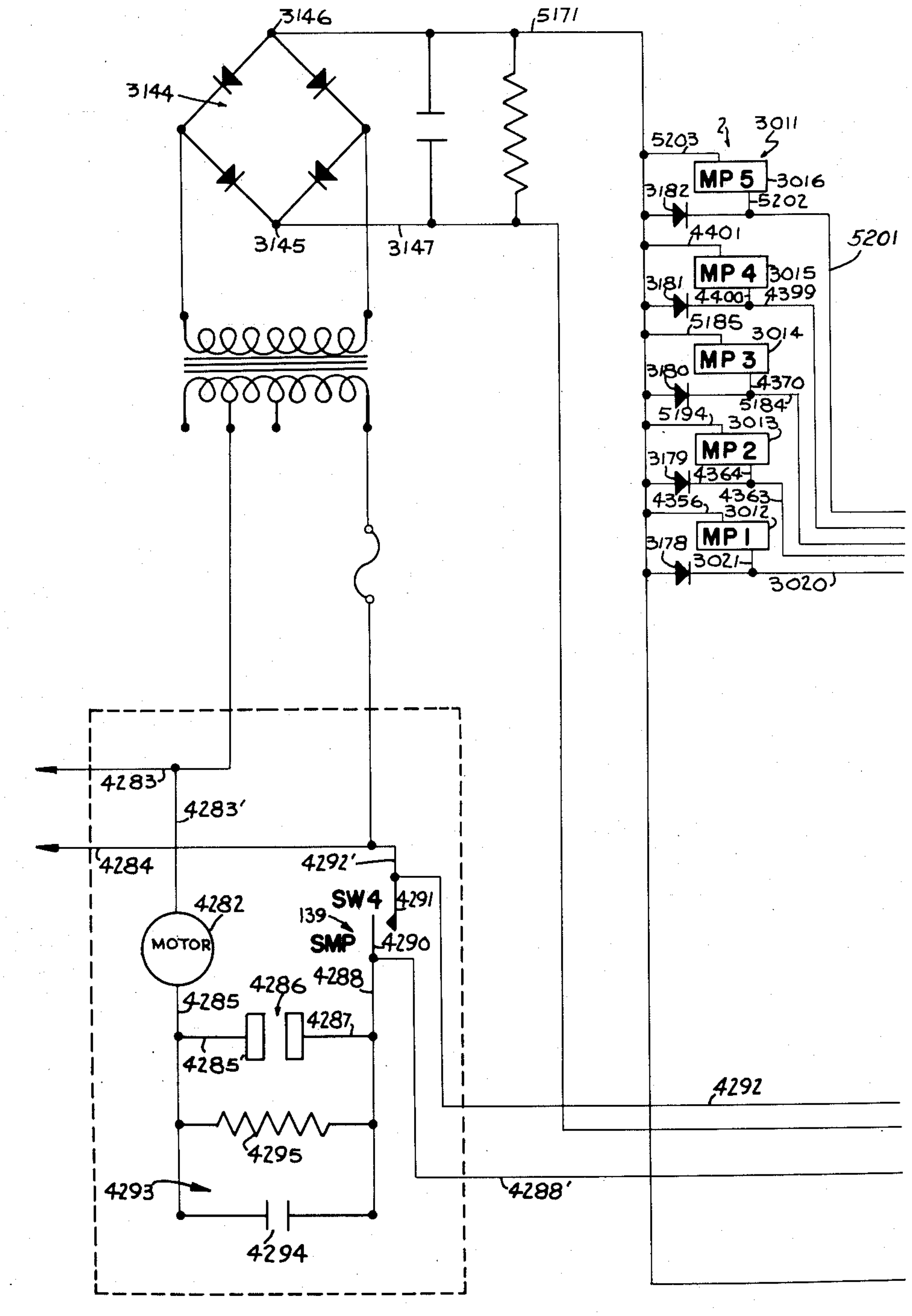
FIG. 15 is a circuit diagram of the power supply system for the apparatus and also shows the electromagnetic devices to control the perforator pins in the tape perforator 2.
Figure 16:
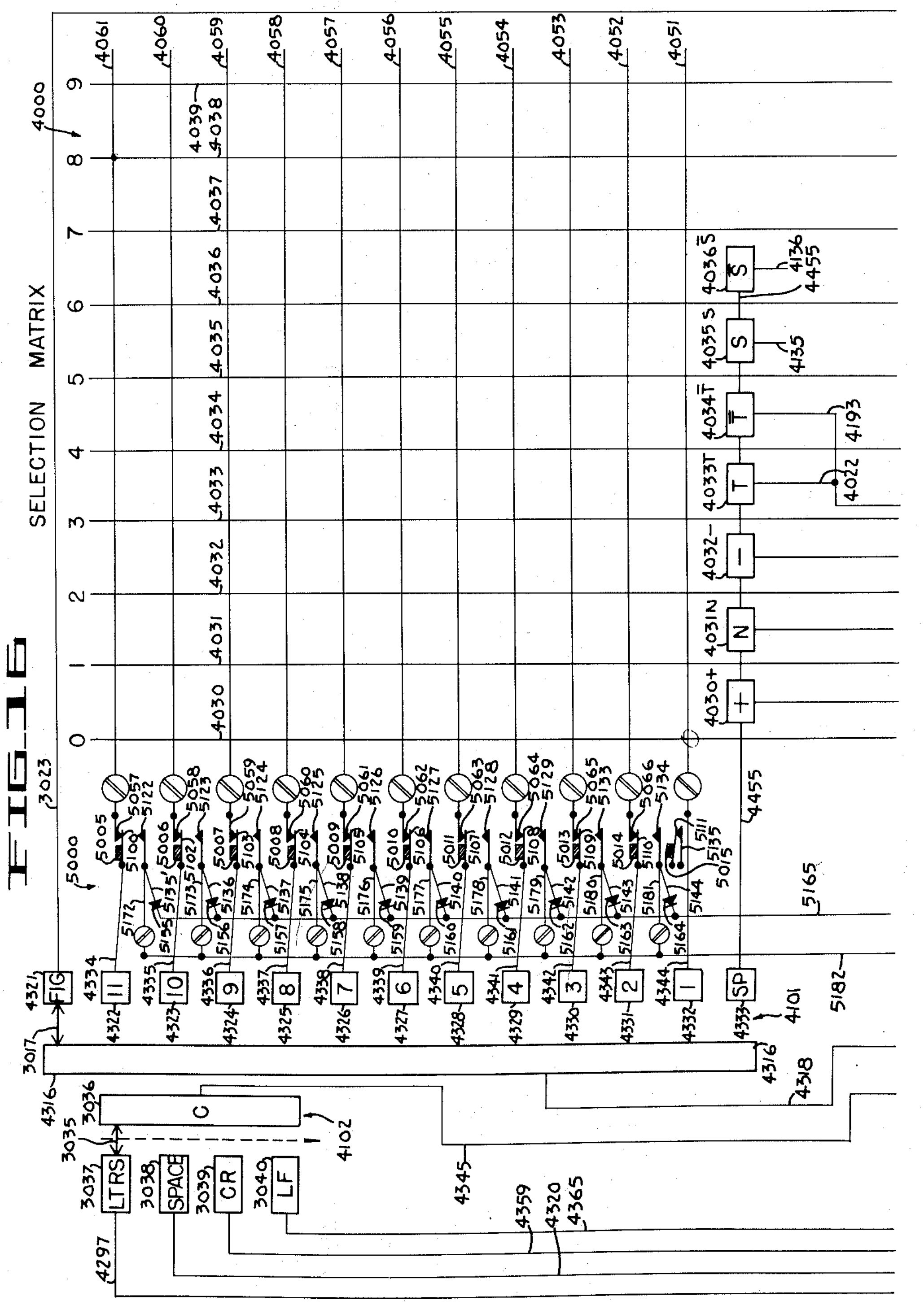
FIG. 16 is a circuit diagram of the readout switch provided in the adding machine and commutator type switches provided in the electrical system, the contacts of the new switch 5000 are also shown in this figure.

The sector gears 188 are mechanically connected to the readout switch 4000, and which, as shown in FIG. 16, is included in, and forms part of, an electrical control system operable to control the operation of a tape perforator 2, shown in FIGS. 1 and 15, and which is operable to perforate a tape in accordance with the code shown in FIG. 3.

READOUT SWITCH 4000

Figure 13:
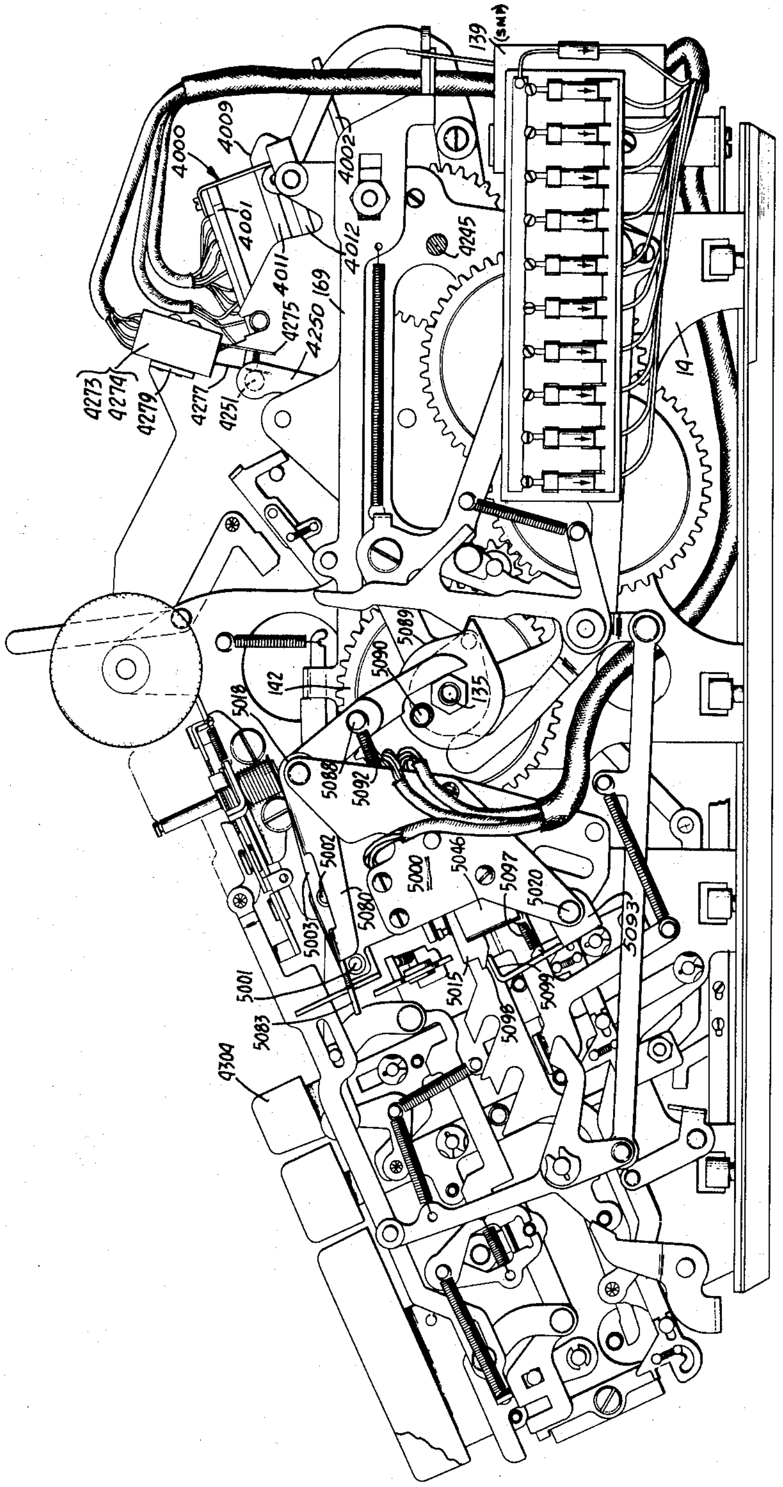
FIG. 13 is a right side elevational view of the Add Punch machine with the cover removed and shows a side view of the new switch 5000 embodying features of this invention.

The readout switch 4000, shown in FIGS. 1, 10, 11, 13 and 16, comprises two contact supporting plates 4001 and 4002 and sets of wiper contacts. The contact supporting plates 4001 and 4002 are supported in spaced relation, the spacing being sufficient to accommodate the wiper contacts and normally the spacing is such that the wiper contacts are out of contact with the contact supporting plates 4001 and 4002. The contact supporting plate 4002, shown in FIG. 13, is upwardly movable, from the position shown, in order that the wiper contact may be brought into engagement with the contact supporting plate 4001. When the contact supporting plate 4002 is moved upwardly to bring the wiper contact point against a contact in the contact supporting plate 4001, an electrical connection is formed from a contact in the contact supporting plate 4001 to a contact in the contact supporting plate 4002, the electrical connection being by way of the wiper contacts, which are in electrical connection with each other through a conducting body portion carried by an insulating member attached to a carriage which is movably supported in a link block 4009 along which the carriage is reciprocated.

The carriage may be moved along the link block 4009 by operation of a connecting rod, one end of which is attached to the sector gear 188, the other end of the connecting rod being provided with a button extending into the space between the parallel spaced arms 4011 and 4012 of the link block 4009, the arrangement being such that when the connecting rod is moved toward the right, as shown in FIG. 13, the carriage is moved endwise along the link block 4009 to carry the wiper contacts in a straight line movement along the space between the spaced supporting plates 4001 and 4002.

The contact supporting plates 4001 and 4002 form, in effect, two sides of the circuit, included in which are commutator switches 4101 and 4102, shown in FIGS. 4, 6, 7 and 16. The readout switch 4000 and the commutator switches 4101 and 4102 cooperatively function to selectively control the operations of the electromagnetically operable punch controlling members in the tape perforator 2.

CONTACT SUPPORTING PLATES OF THE SWITCH 4000

Figure 10:
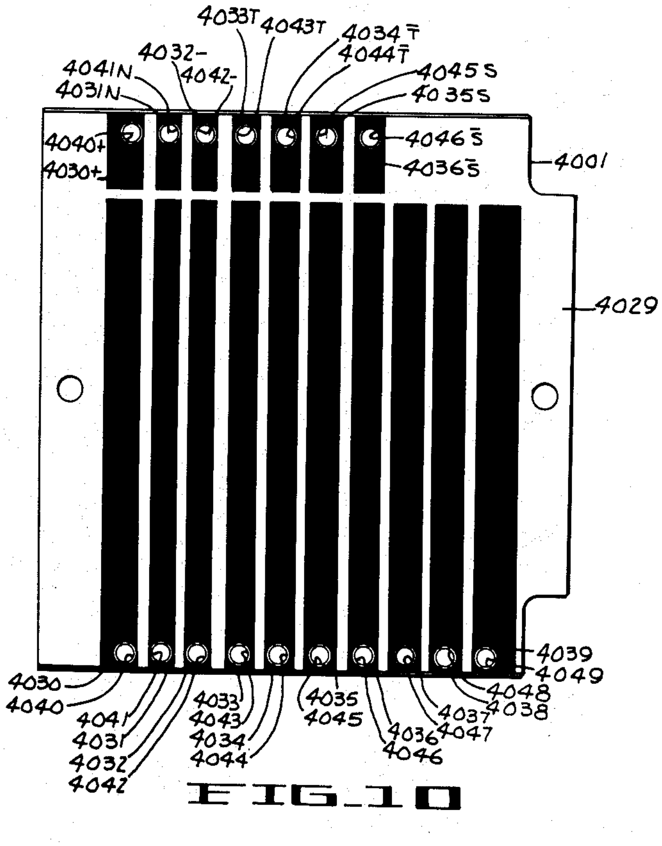
FIG. 10 shows an upper contact structure in the readout switch.

As shown in FIG. 10, the contact supporting plate 4001 is an apertured sheet 4029 of insulating material bearing conducting strips 4030, 4031, 4032, 4033, 4034, 4035, 4036, 4037, 4038 and 4039, the conducting strips 4030 to 4039, inclusive, being located on one face of the insulating sheet 4029 and being in parallel spaced relationship, the spacing of the conducting strips being sufficiently wide to completely insulate one conducting strip from the other. The conducting strips 4030 to 4039, inclusive, terminate at one end in apertured end portions which, as shown in FIG. 10, are in mechanical and electrical connection with tubular terminals 4040, 4041, 4042, 4043, 4044, 4045, 4046, 4047, 4048 and 4049, respectively, which serve as jacks and into which pin-type terminals on conductor wires, not shown, or bared conductor wires, may be connected by thrusting the pin-type terminals, or bared conductor wires, selectively into the tubular terminals as required. The contact supporting plate 4001 is provided, also, with contact segments, identified as 4030+, 4031N, 4032—, 4033T, 4034$\overline{\text{T}}$, 4035S, and 4036$\overline{\text{S}}$, which are in register with, but not connected to the conducting strips 4030, 4031, 4032, 4033, 4034, 4035 and 4036, respectively. The contact segments 4030+, 4031N, 4032—, 4033T, 4034$\overline{\text{T}}$, 4035S and 4036$\overline{\text{S}}$ terminate in tubular terminals 4040+, 4041N, 4042—, 4043T, 4044$\overline{\text{T}}$, 4045S and 4046$\overline{\text{S}}$, respectively.

Figure 11:
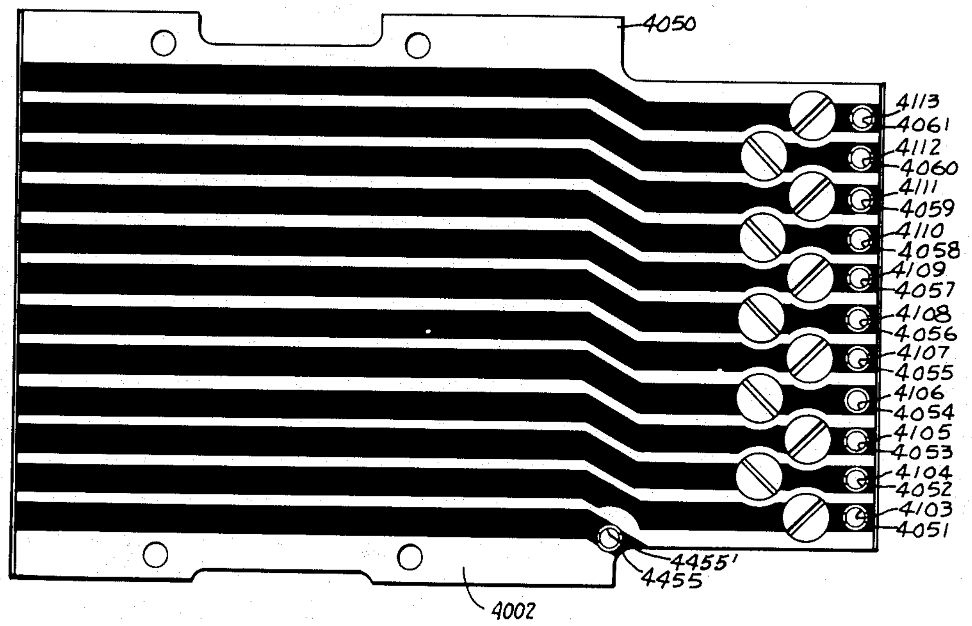
FIG. 11 shows the lower contact structure in the readout switch, the contact members running in a direction 90° with respect to those shown in FIG. 19.

The contact supporting plate 4002 is constructed somewhat like the contact supporting plate 4001, and as shown in FIG. 11, comprises an insulating sheet 4050 bearing on the one face conducting strips 4455, 4051, 4052, 4053, 4054, 4055, 4056, 4057, 4058, 4059, 4060 and 4061 which are spaced-apart sufficiently for complete insulation of one conducting strip relative to another. The conducting strips 4051 to 4061, inclusive, terminate at one end in apertured end portions in which are supported, as shown in FIG. 11, tubular terminals 4103, 4104, 4105, 4106, 4107, 4108, 4109, 4110, 4111, 4112 and 4113, respectively, and into which pin-type terminals on conductor wires, not shown, or bared conductor wires may be inserted as required to connect the conducting strips 4051 to 4061, inclusive, to required parts of the electrical control system.

The conducting strip 4455 is shorter than other conducting strips on the plate 4002 and is provided with the tubular terminal 4455'. The conducting strips 4030 to 4039, inclusive, in the plate 4029, extend in the direction at 90° from the direction of extension of the conducting strips 4051 to 4061, inclusive, in the contact supporting plate 4002, so that the conducting strips 4051 to 4061, inclusive, in effect, cross under the conducting strips 4030 to 4039, inclusive, and the arrangement is such that the conducting strips 4051 to 4061, inclusive, extend as shown in FIG. 16.

The sector gear 188 shown in FIG. 14, is only illustrative of one of the many sector gears employed in the readout switch 4000. It will be understood, therefore, that for each ordinal position in the adding machine portion of the apparatus, there is a sector gear such as 33, a set of gears 337, 338 and 340, and a corresponding sector gear such as 188. When the gear 340, shown in FIG. 14, is in engagement with the sector 33 and the sector gear 188 is by operation of the bail 192 caused to rotate in a counterclockwise direction, as viewed in FIG. 14, the sector gear 188 is rotated in a counter-clockwise direction to the extent permitted by the setting of the sector gear 33 and is effective to thrust the connecting rod toward the right to move the wiper contacts toward the right. The extent of thrust is in accordance with the degree of rotation of the sector gear 33 to normal position and which degree of rotation is in accordance with the value represented by the key 17 manually operated in the selecting mechanism in the adding machine.

The wiper contacts are thrust transversely of the relatively fixed conducting strips 4030 to 4039, inclusive, so that when the supporting plate 4002 is raised to bring the conducting strips into engagement with the lower set of wiper contacts, and to bring the upper set of wiper contacts into engagement with the conducting strips on the supporting plate 4001, the readout switch 4000 will be in a closed condition and operating to electrically connect selected conducting strips on the upper supporting plate 4001 with selected conducting strips on the lower supporting plate 4002, the electrical connections being by way of the wiper contacts of the switch 4000 and the selection being in accordance with amounts accumulated in the computing apparatus 1.

Figure 4:
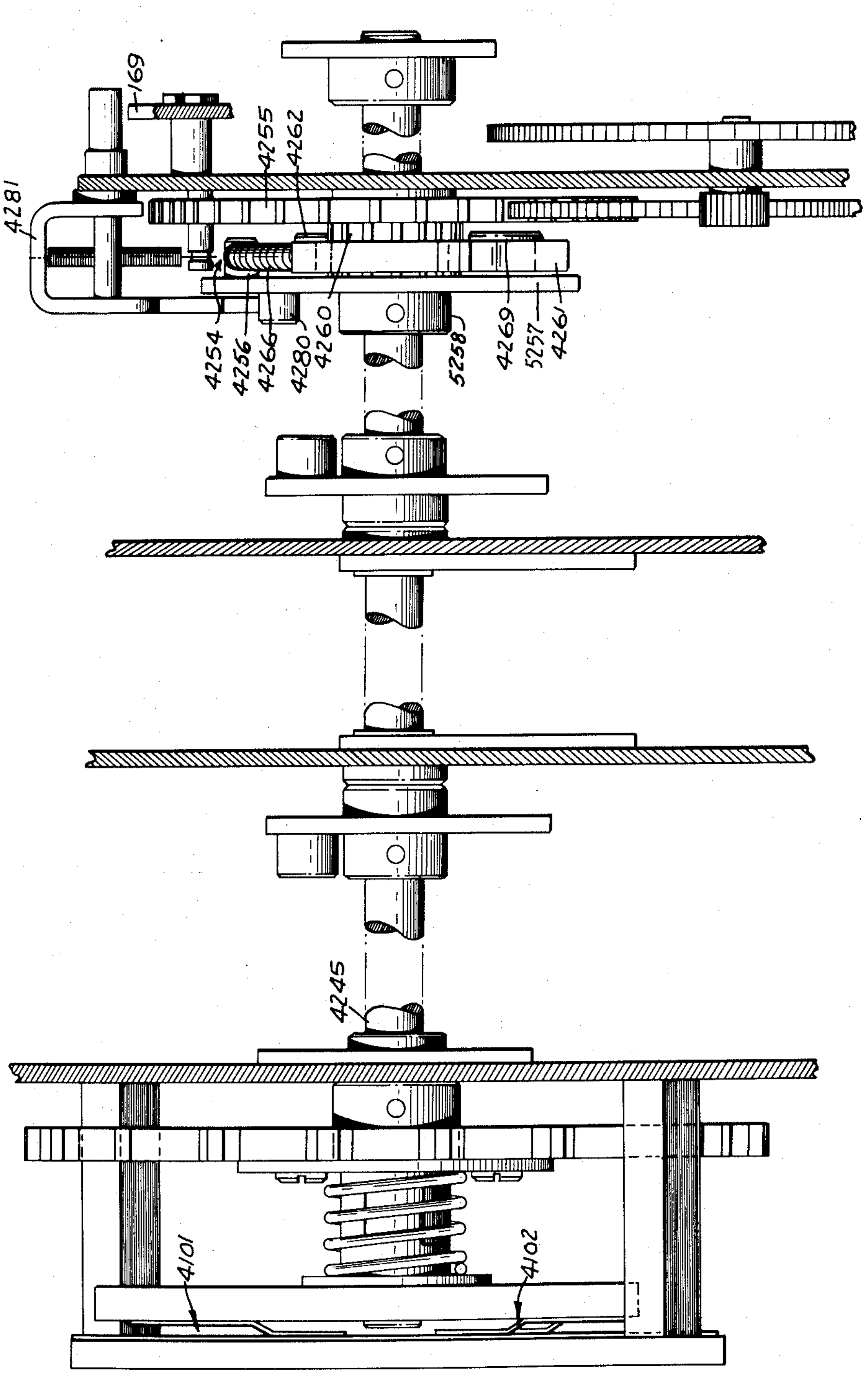
FIG. 4 is an enlarged view, partly in section, of portions of the cam shaft and a commutator type switch forming a control member in the apparatus of this invention.
Figure 18:
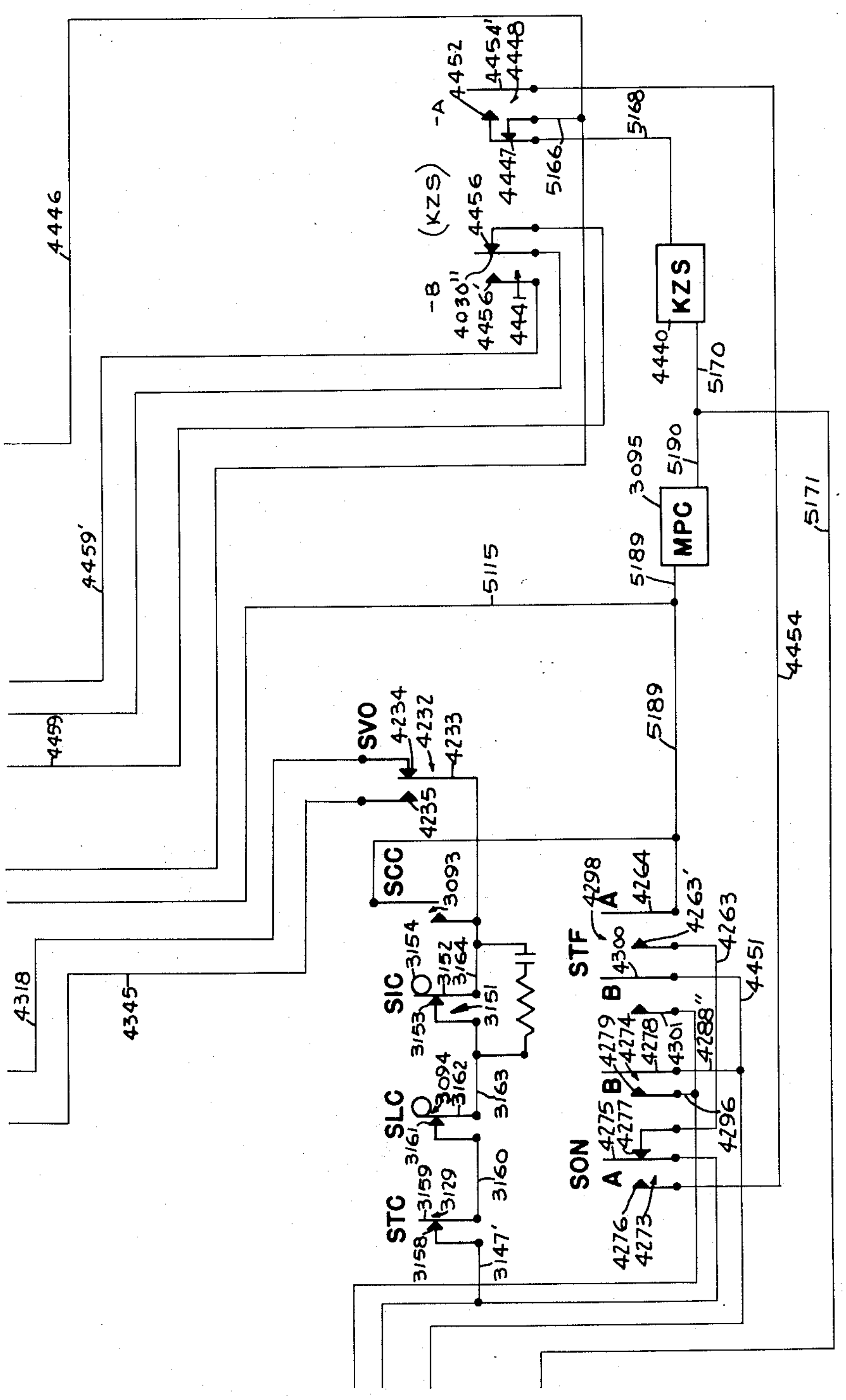
FIG. 18 is in continuation of the circuit diagram of FIG. 17 and shows control switches and relays provided in the electrical system.

The clutch 4254, shown in FIG. 4, comprises a toothed ratchet 4260 secured to the power-driven gear 4255, a toothed pawl 4261 pivotally supported at 4262 on a cam plate 5257 having a hub 5258 secured to the shaft 4245. The pawl 4261 is a C-shaped member pivotally supported at one end and is equipped with a tooth arranged to engage in the teeth of the ratchet 4260. A spring 4266, secured at one end to the pawl 4261 and at the other end to a pin 4256 supported in, and extending from, the cam plate 5257, constantly urges the pawl 4261 toward engagement with the ratchet 4260. The pawl 4261 is, at times, held against engagement with the ratchet 4260. A large headed pin 4269 is supported in the cam plate 5257 and extends through an enlarged aperture to movably support the pawl 4261 on the cam plate 5257. The switches 4273 and 4274 are single pole switches and comprise, in each case, a movable contact and a relatively fixed contact, for example, as shown in FIG. 18, the switch 4273 (SONA) comprises the movable contact 4275 and the relatively fixed contacts 4276 and 4277. The switch 4274, as shown in FIG. 18, comprises the movable contact 4278 and the relatively fixed contact 4279. In the switch 4273, the left side of the switch is normally open, as shown in FIG. 18. The movable contacts 4275 and 4278 of the respective switches 4273 and 4274 are spring supported and are moved by means of a pin 4251' on the lever 4250.

INTERLOCK FOR FUNCTIONAL KEYS DURING READOUT

Figure 5:
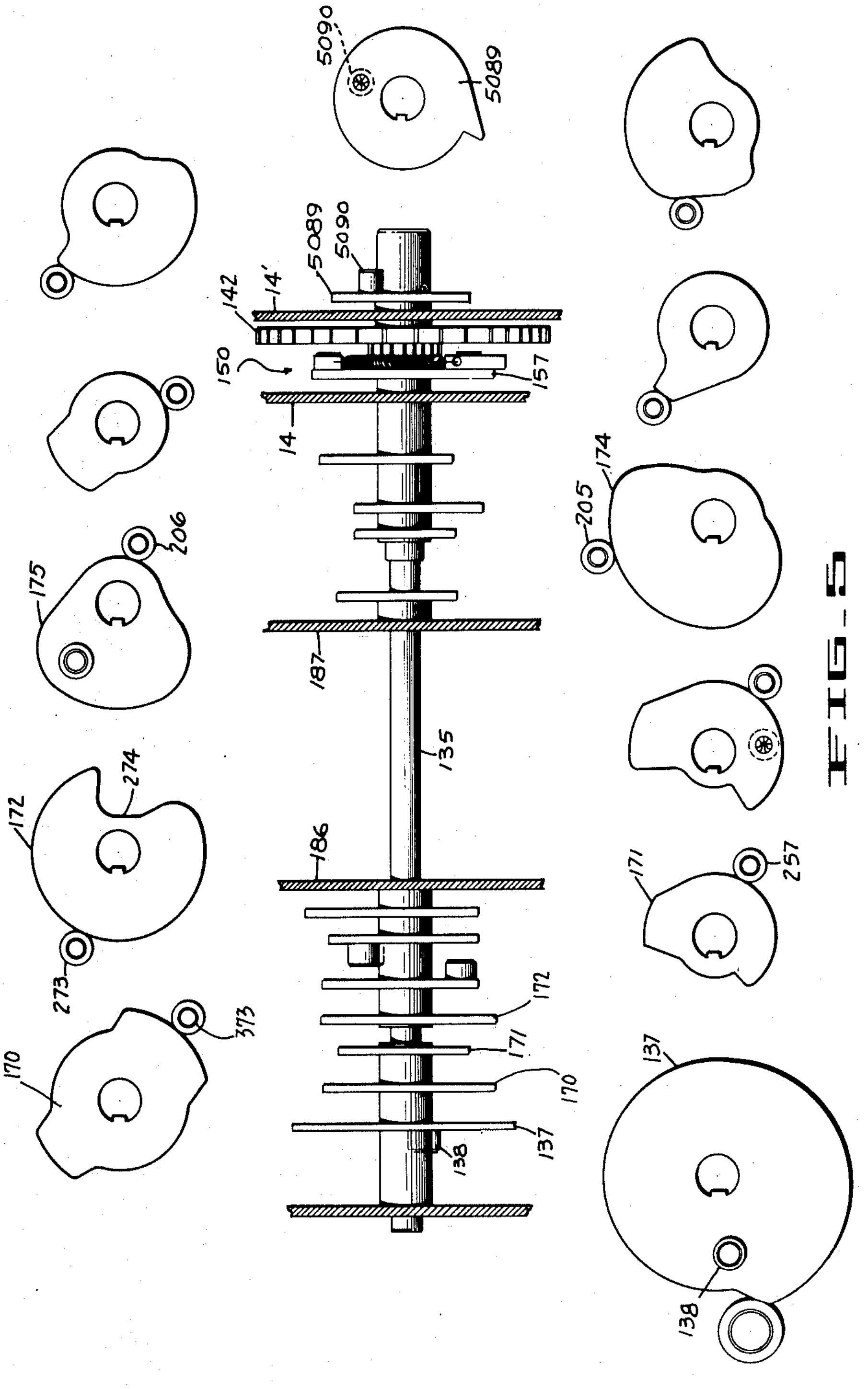
FIG. 5 is a side view of another assembled cam shaft and plan views of the cams included therein.

The cam plate 5257, as shown in FIG. 4, of the clutch 4254 is provided with an outwardly extending pin 4280 to control the operation of a latch 4281 controlling the operation of the functional keys of the adding machine. The functional keys of the adding machine, such as the "clear keyboard," "total," "plus," "minus," and "print only" are all operable to control the application of power to the adding machine in the same manner as covered in the afore-mentioned application S.N. 469,128, Patent No. 2,861,739, issued November 25, 1958, the control being by virtue of a link 169 which is moved forwardly to close the switch 139 (SMP), as shown in FIG. 13, the function of which is to control the application of power to the motor 4282, shown in FIG. 1. The source of current supply, not shown, may be any suitable supply such, for example, as an alternating current supply line of about 115 volts, the supply conductors 4283 and 4284, as shown in FIG. 15, being operable for connection to the commercial supply lines. When the functional keys of the adding machine are operated, the switch 139 (SMP) is closed by forward movement of link 169. The initial supply of current from the motor may be traced as follows: conductor 4283, conductor 4283′, motor 4282, conductor 4285, conductor 4285′, centrifugally operated speed governor switch 4286, conductor 4287, conductor 4288, movable contact 4290 and fixed contact 4291 of switch 139 (SMP), conductor 4292′, conductor 4284 to the commercial source of current supply, not shown. A spark arresting circuit 4293, involving the condenser 4294 and resistance 4295, is provided around the contacts in the speed governor switch 4286. The initial operation of the motor 4282, when a functional key in the adding machine is depressed, is sufficient for operation of the adding machine 1 in a complete cycle of enrteing and computing amounts, there benig a one rotation, or single cycle, clutch 150, FIG. 5, provided between the cam shaft gear 142, which is driven through a suitable shaft and gear train means extending from the motor to the clutch 150 and through the cam plate 157 to the cam shaft 135, shown in FIG. 5. After the initial energization of the motor 4282 over the above-described circuit, motor 4282 is, at times, energized over a second circuit when a readout operation is occurring from the switch 4000, the second circuit involving contacts in the switch 4274 and may be traced as follows: source of current supply, not shown, conductor 4283, conductor 4283′, motor 4282, conductor 4285, conductor 4285′, speed governor switch 4286, conductor 4287, conductor 4288, conductor 4288′, conductor 4288″, movable contact 4278 and fixed contact 4279 of switch 4274 (SONB), conductor 4296, conductor 4292, conductor 4292′, and conductor 4284, to source of current supply, not shown.

A third motor supply circuit is provided, which is brought into operation through the manual operation of switch 4298 (STF) which has A and B pairs of contacts, the third circuit for the motor being by way of the B pair of contacts in the switch 4298 and traceable as follows: source of current supply, not shown, conductor 4283, conductor 4283′, motor 4282, conductor 4285, conductor 4285′, speed governor switch 4286, conductor 4287, conductor 4288, conductor 4288′, conductor 4451, movable contact 4300, and fixed contact 4301 of switch 4298 (STF), conductor 4292, conductor 4292′, and conductor 4284, to source of current supply, not shown.

Closing of the manually operated switch 4298 (STFA) controls the operation of the electromagnet 3095 (MPC), which controls the clutch 3104 in the tape perforator 3000. The circuit for operation of the electromagnet 3095, in this case, may be traced as follows: source of current supply, not shown, conductor 3147, movable contact 4275 and right-hand fixed contact 4277 of switch 4273 (SONA), conductor 4263, fixed contact 4263′ and movable contact 4264 of switch 4298 (STFA), conductor 5189, winding of electromagnet 3095 (MPC), conductor 5190, conductor 5171 to point 3146 of rectifier 3144. The switch 4298 (STFA) provides a means for controlling the operation of the tape perforator 3000 to feed tape therethrough without causing operation of the selector electromagnets 3011 and therefore without having perforations appear in the tape to indicate values.

*Tape perforator*

The tape perforator 2, which will hereinafter be referred to as the tape perforator 3000, may be so far as this invention is concerned, a conventional record making machine operable to make reproducible records of the amounts entered and accumulated in a computing machine.

For the purpose of illustrating the invention, and not in a sense of a limitation thereof, the record making machine, shown and described herein, has a conventional tape perforator 3000 operable to make a five channel perforated tape record representative of amounts entered and accumulated in a computing apparatus 1 and electrically represented in the readout switch 4000 contained therein.

The value "1", according to the illustration in FIG. 3, would be represented by a perforation in each of the first two positions followed by the feed hole, and the perforation in the third position followed by a blank space and then a perforation in the fifth position. The value "3" would be represented by a perforation in the first position only, this single perforation may be also used to represent the letter "E" if the single perforation in the first position is preceded by a set of perforations representing the designation LTRS (letters) which calls for the perforation in each of the five value positions.

A void key 4218, FIG. 1, is provided to operate the void switch 4232 (SVO), which is, in effect, a single pole, double throw switch and operable to switch over the control of the electromagnetic means in the tape perforator to a rotary commutator switch 4102 to make the perforator operate to punch designations representing LTRS, CR, SPACE and LF, or other predetermined function or character signals, as required. The switch 4232 comprises a central spring contact 4233 normally spring-biased to engage the right-hand or lower contact 4234 until the VOID key 4218 is depressed, whereupon the central contact 4233 is moved away from the contact 4234 and into engagement with the left-hand or upper contact 4235.

A "PRINT ONLY" key 4304, FIG. 1, is provided to make the apparatus print the amounts or other information entered without accumulating for a total. The "PRINT ONLY" key 4304 is simply a manually operated functional key in the ten-key adding machine portion of the apparatus in this invention and corresponds in its structure and arrangement and in its function to the "PRINT ONLY" key found in the ten-key adding machine shown and described in an application, S.N. 407,016, filed January 29, 1954, now Patent No. 2,832,530, under the name of Harold J. Chall entitled "Listing Adding Machine Mechanism"—continuation-in-part of application S.N. 354,151, filed May 11, 1953, now abandoned. The application S.N. 407,016 resulted in Patent No. 2,832,530, issued April 29, 1958, entitled "Value Selecting and Transmitting Mechanism for Listing Adding Machine."

The segmental contact 4321, FIG. 16, in the switch 4101 is at the "FIGS" position for engagement by a wiper contact 3017 in the commutator switch 4101. The "FIGS" position segmental contact 4321 is in electrical connection with the winding of the electromagnetic device 3012 by way of conductor 3023, diode 3024, conductor 3025 and conductors 3020 and 3021. The segmental contact 4321 is also in electrical connection with the winding of the electromagnetic device 3013 by way of conductor 3023, conductor 4500, conductor 4501, diode 4502, conductor 4503 and conductors 4363 and 4364. The segmental contact 4321 is also in electrical connection with the winding of the electro magnetic device 3015 by way of conductor 3023, conductor 4500, diode 4506, conductor 4399 and conductor 4400. The segmental contact 4321 is also in electrical connection with the winding of the electromagnetic device 3016 by way of conductor 3023, conductor 4500, diode 4507 and conductors 5201 and 5202.

COMMUTATOR SWITCH 4102

Figure 7:
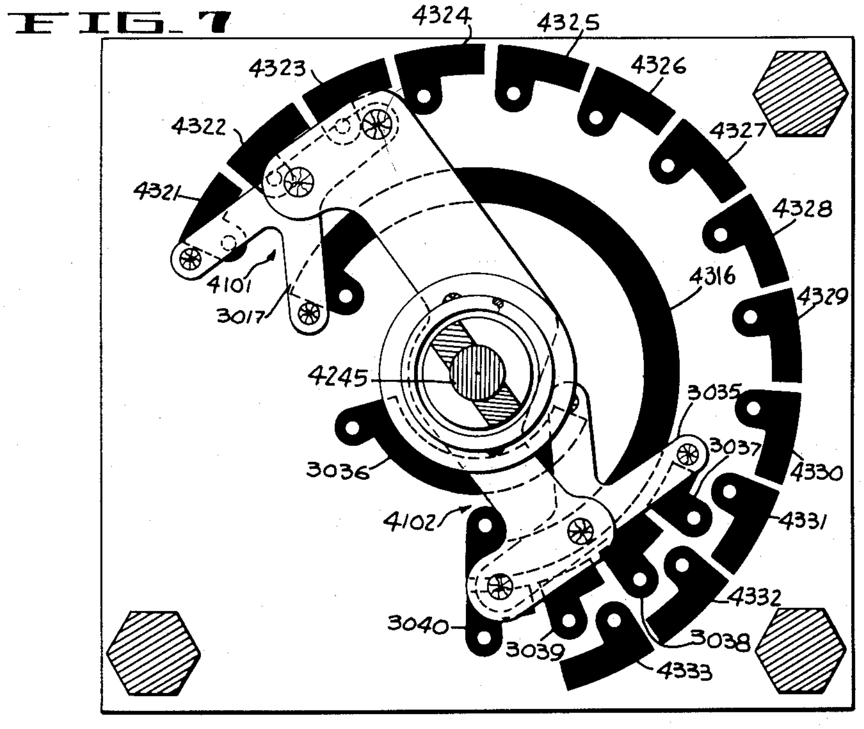
FIG. 7 is a face view of the commutator type switch shown in FIG. 10.
Figure 6:
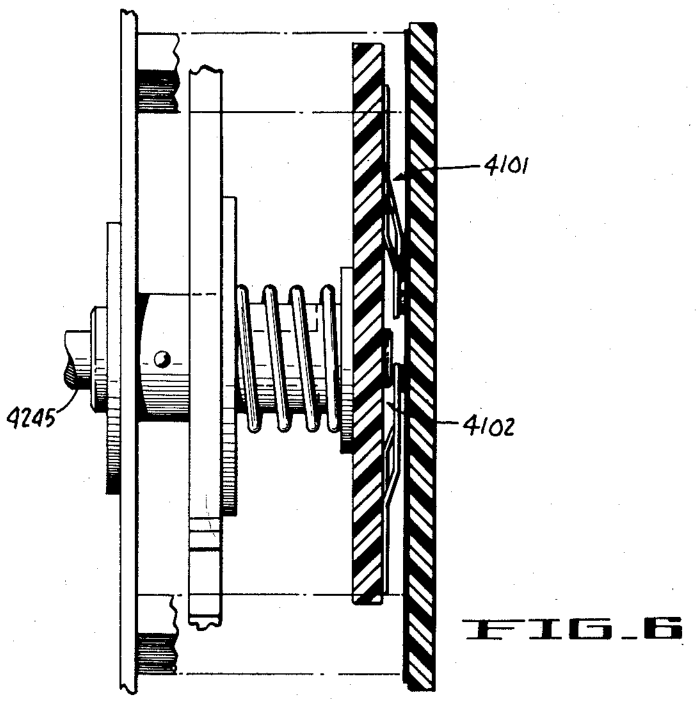
FIG. 6 is a view, partly in section, of the commutator type switch.
Figure 8:
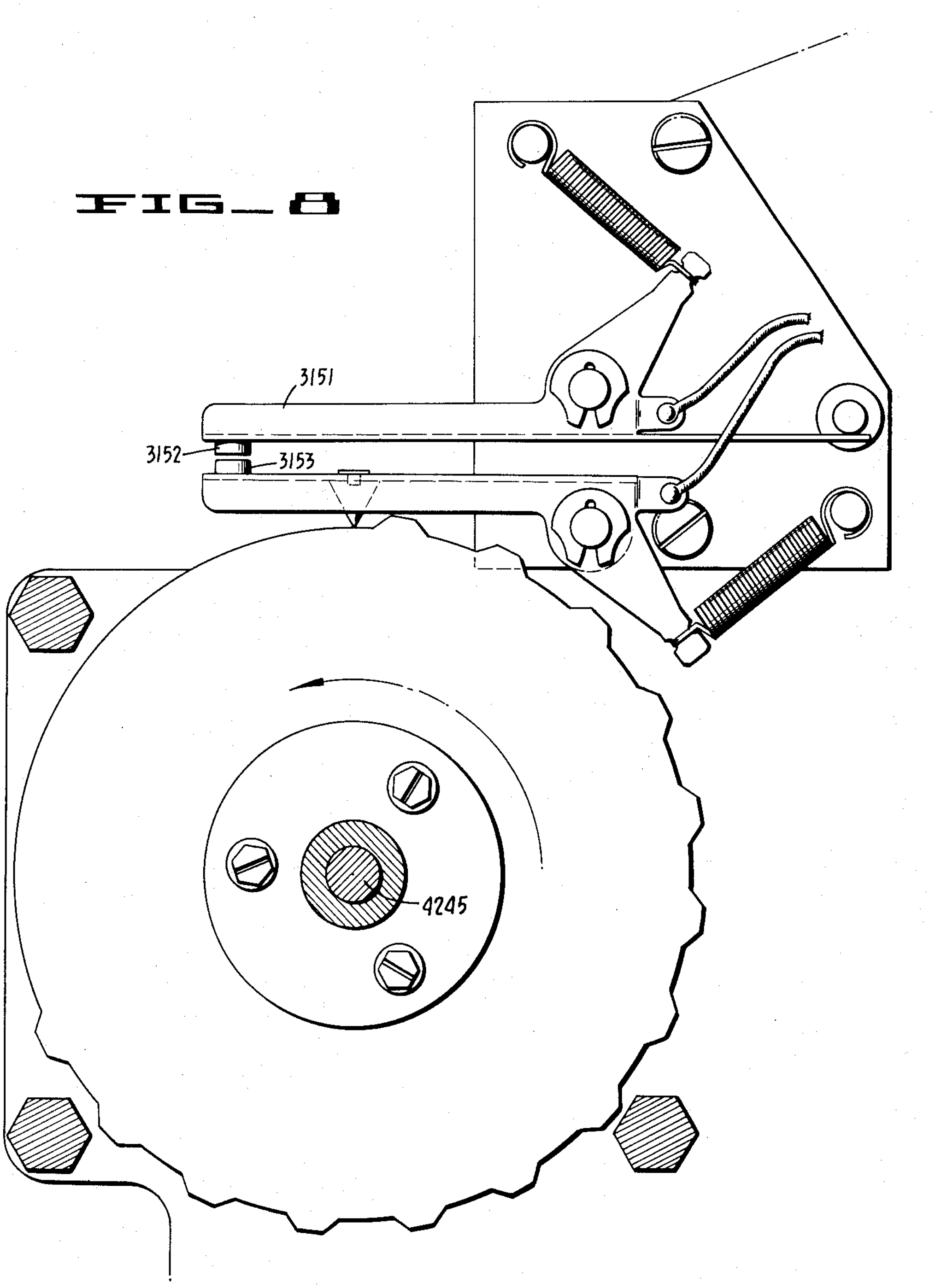
FIG. 8 is a face view of the cam operated switch operable to complete circuit connections at required predetermined intervals.

The switch 4102, FIGS. 4, 6 and 7, is employed as a commutator switch for controlling the operations of the electromagnetic devices 3012 to 3016, inclusive, in the tape perforator 3000 when the electromagnetic devices are to be operated to control the punches to make sets of perforations in the tape, representing directional and operational signals to be given the machine operating under control of the tape. For example, when the wiper contact 3035 is on the segmental contact 3037, the electromagnetic devices 3011 will be selectively operated to selectively control the punches to make perforations in the tape, representing a code signal for the word "LETTERS" or abbreviation thereof of "LTRS." When the wiper contact 3035 is on the segmental contact 3038 the electromagnetic device 3012 would be operated to control the punch associated therewith to perforate the tape in such positions as to indicate that the signal stands for the word "SPACE." A signal representing "Line Feed," "LF" will be formed in the tape when the wiper contact reaches segmental contact 3040.

Figure 19:
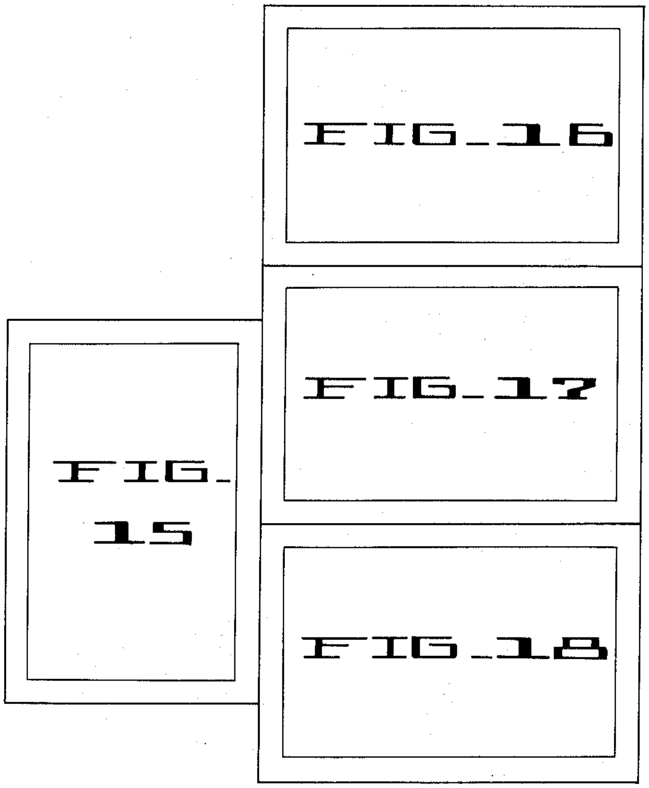
FIG. 19 shows the relative arrangement that should be made of FIGS. 15, 16, 17 and 18, respectively, to illustrate the electrical system employed in this invention.

The commutator switch 4102 may be brought into, or out of, control, with respect to the electromagnetic devices 3011, by operation of the "VOID" switch 4232 (SVO). When the movable contact 4233 of the single pole, double throw, switch 4232 is operated, by operation of the "VOID" key 4218, to make the movable contact 4233 move from engagement with the fixed contact 4234 and into engagement with the fixed contact 4235, the switch 4101 will be switched out of the electrical system and the switch 4102 will be switched into the electrical system relative to the electromagnetic devices 3011 in the tape perforator 2. It will be seen, therefore, as shown in FIGS. 15, 16, 17 and 18, respectively, arranged as indicated in FIG. 19, that when the switch 4232 has its movable contact 4233 in engagement with the fixed contact 4234, the circuit extends to the switch 4101 which serves as a commutator for the readout switch 4000, and that the readout switch 4000 is in condition to act as a control for the set of electromagnetic devices 3011 in the tape perforator 3000. Also, that when the switch 4232 has its movable contact 4233 in engagement with the fixed contact 4235, the circuit is extended to the commutator switch 4102 and this switch is in condition to control the operation of the electromagnetic devices 3011 in the tape perforator 3000.

The switch 3094 is located directly in front of the switch 3093 (SCC) and, as shown in FIG. 18, is normally closed, but opens in mid-cycle to release the clutch magnet 3095 (MPC) from energization. The clutch magnet 3095, FIG. 18, is operable to control the operation of clutch 3097, the function of which is to control the application of power from a belt-driven pulley 3098 to the cam shaft 3004 of the tape perforator 3000. The pulley 3098 is driven by means of a belt 3099 extending from a pulley 3100 secured to a shaft 4 extending from a gear system 3101, FIG. 1, driven by means of a shaft 3102 extending from the motor 4282 of the computing apparatus 1. The clutch 3097 is an expansion clutch and is provided with a rotatable clutch member 3104 operable to transmit rotations from the pulley 3098 to a shaft 3004 which extends through the clutch 3104 and into the interior of the tape perforator 3000 and serves as the cam shaft of the tape perforator. The clutch member 3104 is provided with a lug 3105 operable to engage an armature 3106 of the electromagnetic device 3095 (MPC), unless the electromagnetic device 3095 is energized. When the armature 3106 is engaged by the lug on the clutch member 3104, the clutch member 3104 is held against rotation and the cam shaft 3004 of the tape perforator 3000 is not operated. When the electromagnetic device 3095 (MPC) is energized to remove its armature 3106 from the path of movement of the lug 3105, the clutch 3097 operates to transmit power from the pulley 3098 to the cam shaft 3004 of the tape perforator. A backlash stop arrangement, formed in a collar 3108 secured to the shaft 3004, prevents reverse rotations of the cam shaft 3004.

TAPE FEED

As shown in FIG. 1, the tape 3008 is fed over a roller 3109 and passes under a guide portion 3110 and between apertured pin blocks 3076 in which the upper ends of the tape perforator pins are arranged to operate. If the tape 3008 breaks during the operation of the apparatus, a pivotally supported lever supporting the guide 3110, will be allowed to rotate counter-clockwise under the pull of a spring to operate a lever system to open a switch 3129 (STC) to stop operation of the tape perforator until the tape is again made taut under the guide 3110. Undue tightening of the tape 3008 will also cause opening of the switch 3129.

ACTUATOR MECHANISM (FIG. 14 AND PART OF 12)

The actuator mechanism, with the exception of the connection with the readout switch 4000, is substantially the same as the actuator employed in a ten-key adding machine described in the afore-mentioned patent, and comprises an axle shaft 185, FIG. 14, journaled at its ends in intermediate frame plates of the machine and extending transversely of the machine above, and substantially parallel to, the cam shaft 135. Actuator sectors 188, equal in number to the number of selector sectors 33 plus two, are journalled in side-by-side or ordinal arrangement on the axle shaft 185 and extend from the axle shaft toward the shiftable selector unit 11, shown in FIG. 2, and constituting a portion of the digitation mechanism.

Each actuator sector 188 is substantially the shape of a section of a circle, and the axis of the axle shaft 185 extends through the centers of the hypothetical circles of which the corresponding sectors constitute sections. Gear teeth are provided on the arcuate edges of the actuator sectors 188 and each sector is provided with an elongated opening 190 having a longitudinal curvature centered on the axis of the shaft 185. The sectors may also be provided with weight reducing openings, as shown in FIG. 14, if desired.

Figure 23:
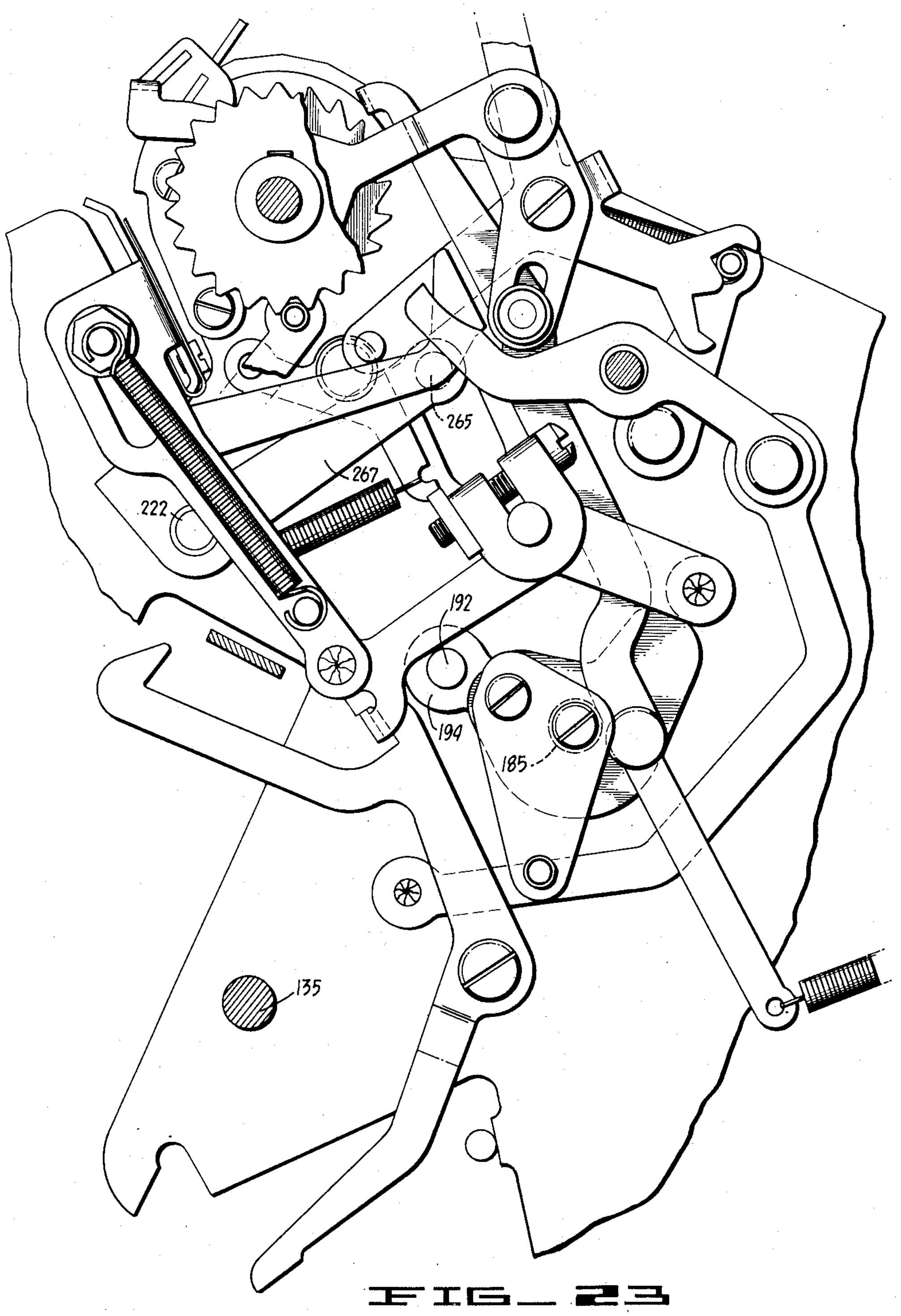
FIG. 23 is a general illustration of the ribbon shifting and tape feeding mechanisms of the adding machine portion of the apparatus.

A rod, or bail, 192 extends through the openings 190 in the several actuator sectors and arms 193 and 194, not visible in FIG. 14, but 194 being visible in FIG. 23, but connected between the corresponding ends of the bail 192 and the shaft 185 near the correspondingly opposite ends of the shaft, support the bail 192 in spaced and parallel relationship to the axle shaft 185.

Bail 192 is positively movable downwardly and upwardly and during an operating cycle of the machine is first moved to its lower position, is maintained in its lower position for a predetermined time interval, and is then restored to the upper position.

The latch lever 208 is angularly bent intermediate its length to provide at the side thereof adjacent the bail 192, a concave seat 210 which receives a roller 210' rotatably mounted on the bail 192, the roller 210' being received in a corresponding seat 210 when the bail is in its upper limiting position relative to the corresponding sector 188. The latch lever 208 is resiliently held in engagement with the bail by a spring 211 connected between the sector 188 and the distal end of an arm 212 projecting angularly from the pivoted end of the latch lever 208. The portion of the latch lever 208 between the seat 210 and the free end of the latch lever, constitutes a longitudinally curved tail portion 213 directed from the bail 192 toward the shaft 185.

Figure 27:
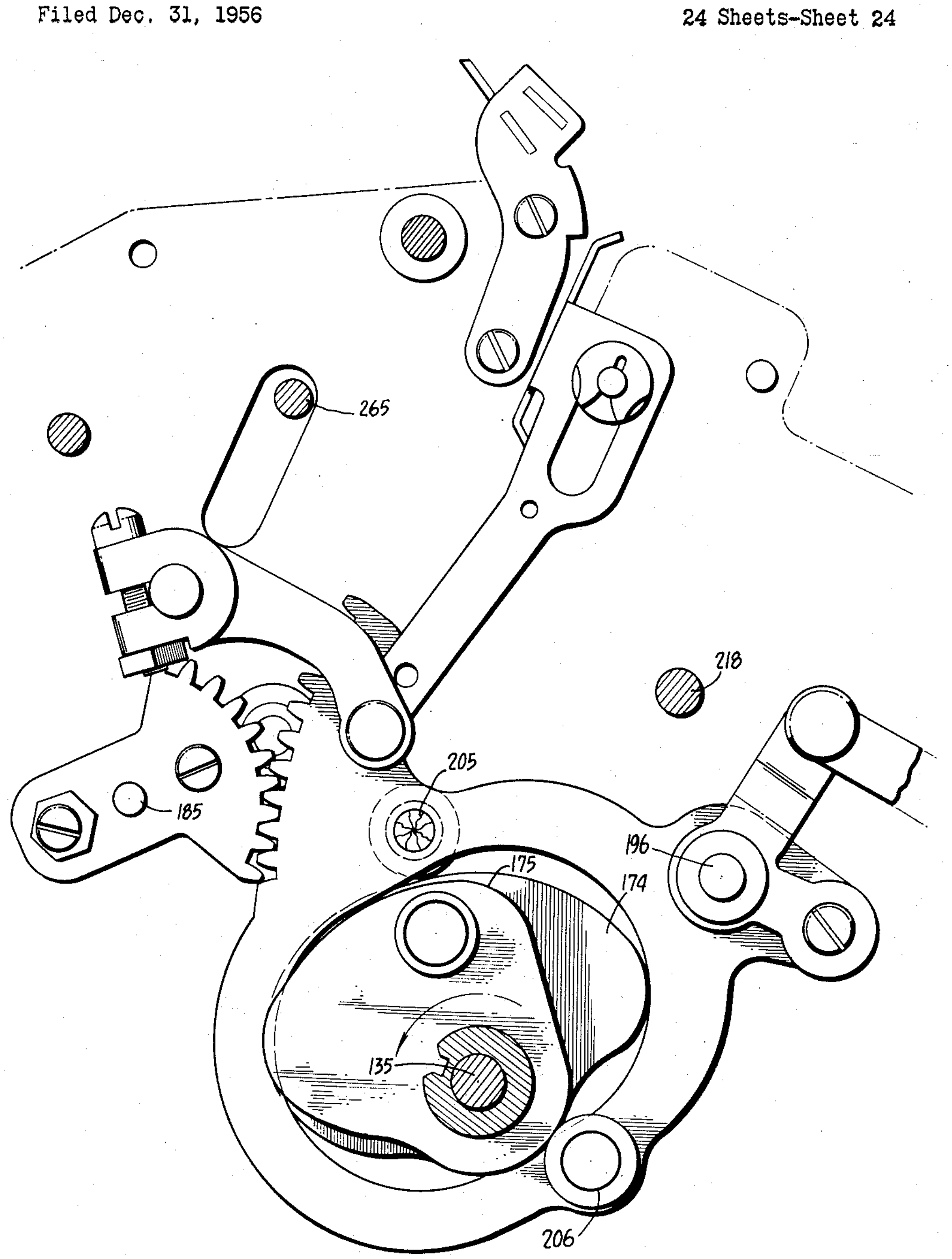
FIG. 27 is taken from the left of the machine and is an elevational view of the actuator sector trail and lead cams, and the mechanism operated by these cams, and lever system.

When the bail 192 is pulled downwardly by the action of the lead cam 175, shown in FIGS. 5 and 27, respectively, on the cam follower 206, engagement of the bail in the latch lever seat 210, shown in FIG. 14, holds the sector 188 down until the sector is positively stopped at an angular position predetermined by the setting of the corresponding selector sector 33 at which time the bail moves out of the seat 210 and along the concave edge of the tail portion 213 of the latch lever to complete the downward movement of the bail 192. As the bail 192 moves along the tail portion 213, it maintains downward pressure on the sector 188 and the angularity of the tail portion to the remainder of the latch lever is such that this pressure is sustained by the force of spring 211 when the bail starts up again and until the bail 192 positively engages the sector and returns it upwardly to its home or full-cycle position, the bail 192 being moved upwardly by the action of cam 174 on follower roller 205.

When the bail 192 moves upwardly relative to the actuator sector gears 188, it comes into engagement with abutment formation 214, as shown in FIG. 14, at the upper ends of the openings 190 in the sectors 188, simultaneously moving into the seats 210 of the latch levers 203 and then moving the actuator sectors upwardly until the upper radial edges of the sectors abut against the stop bar 215, in the upper, or full-cycle position of the actuator sectors.

*Printing mechanism*

During the downward stroke of the actuator sectors 188, and while the latch levers 238, FIG. 14, are held out of engagement with the notches 220 in the drive gear hubs 219 by the bail 250, those drive gears in alignment with selector sectors which have been manually set to numeral values, will be rotated away from their old positions in the manner presently to be described, so that when the actuator bail 192 approaches the end of its downward movement and the bail 250 is moved to release the latch levers 238, the notches in the drive gears, which have been rotated from their old positions, will be moved out of registry with the corresponding zero foil latch lever detents 248. These detents will not be able to reenter the corresponding notches 220 and will be held on the cylindrical peripheral surfaces of the corresponding hub formations 219 so that the corresponding latch lever detents 241 will be held out of engagement with the shoulders 237 of the corresponding print wheel carriers 221, leaving these carriers free to rock the print wheels 230 carried thereby toward the platen 242 during the printing operation presently to be described.

1. PRINT WHEELS AND GEAR MECHANISM

The printing mechanism, generally indicated at 216 in FIG. 14, is disposed above the actuator mechanism with its orders in alignment with corresponding orders of the actuator mechanism. A plurality of print wheel drive gears 217 are journalled on a drive gear shaft 218, which extends transversely of the machine above-mentioned and parallel to the cam shaft 135, and is mounted at its ends in the intermediate frame plates 186 and 187. The gears 217 are disposed in side-by-side or ordinal arrangement along the shaft 218 and the number of the gears is equal to the number of actuator sectors 188. Each gear 217 includes a central hub portion 219 of cylindrical shape provided with a peripheral notch 220, the purpose of which will be later explained.

A plurality of print wheel carriers 221 are rockably mounted intermediate their length from a fixed shaft 222 which extends transversely of the machine in spaced and parallel relationship to the shaft 218. Each carrier 221 includes a pair of parallel arms 223 and 224 with the pairs of arms arranged in side-by-side or ordinal arrangement along the shaft 222 and in alignment with corresponding drive gears 217 and actuator sectors 188. Both arms 223 and 224 extend upwardly from the shaft 222 and near the upper end of the arm 224 a pivot pin, or axle, 225 extends transversely through the two arms of each pair and carries an idler gear 226 which meshes with a corresponding drive gear 217. The arm 223 of the carrier pair 221 is extended upwardly and forwardly beyond the upper end of the arm 224 and carries an axle pin 227 spaced above the axle pin 225. Print wheel gear 230 is journalled on the axle pin 227 and includes a spur gear portion 231, the teeth of which mesh with the teeth of the idler gear 226 mounted in the same carrier and which is formed on one side of the print wheel portion 232 having printing bosses 233 projecting from the periphery thereof at uniformly spaced angular intervals therearound. It will be noted that the printing bosses 233 are spaced-apart and that the outer surfaces of these bosses are made concave in a direction circumferentially of the printing wheel so that the outer surfaces of the bosses will fit against the cylindrical surface of a printing platen 242.

2. ZERO FOIL LATCH MECHANISM

Each of the arms 223, as shown in FIG. 14, is provided with an extension 235 directed forwardly from the pivot shaft 222 and overlying one side of the outer portion of the corresponding drive gear 217 to serve as a guide for maintaining the corresponding drive gears 217 and idler gears 226 in meshing alignment with each other. The arm 223 is also extended forwardly of the print wheel axle pin 227, as indicated at 236, and this forward extension is notched out to provide at its lower portion a latched shoulder 237 facing upwardly and forwardly. A plurality of irregularly shaped zero foil latch levers 238, equal in number to the number of print wheel drive gears 217 and print wheel carriers 221, are pivotally mounted intermediate their length on a fixed shaft 239 which extends transversely of the machine in spaced and parallel relationship to shafts 218 and 222. Each of these zero foil latch levers 238 has an upwardly directed arm 240 provided at its upper end with a detent formation 241 which engages the shoulder 237 on the corresponding print wheel carrier arm 223 to releasably latch the corresponding print wheel in non-printing position in which it is spaced from the associated printing platen 242. The latch levers 238 are received in corresponding transverse notches or recesses in a comb bar 243 which extends transversely of the machine above and parallel to the shaft 239 to maintain these latch levers in properly spaced relationship to each other. Each lever has a forwardly directed lever arm 244 and a rearwardly directed arm 245, the rear end portion of which is disposed against the same side of the corresponding drive gear 217 against which the forward extension 235 of the carrier arm 223 is disposed. A spring 246 is connected between the distal end of each forwardly directed latch lever arm 244 and a fixed spring attaching bar 247 extending transversely of the machine above, and substantially parallel to, the shaft 239, these springs urge the corresponding latch levers 238 to rock in a clockwise direction, as illustrated in FIG. 14. Each rearwardly directed latch arm 245 has on its rearward end a downwardly directed detent 248 which drops into the notch 220 in the corresponding print drive wheel hub 219 to free the latch arm for clockwise rocking movement by the associated spring 246 to a position in which the latching detent 241 at the upper end of the upwardly directed arm 240 of the latch lever engages over the corresponding shoulder 237 on the carrier arm 223.

Figure 26:
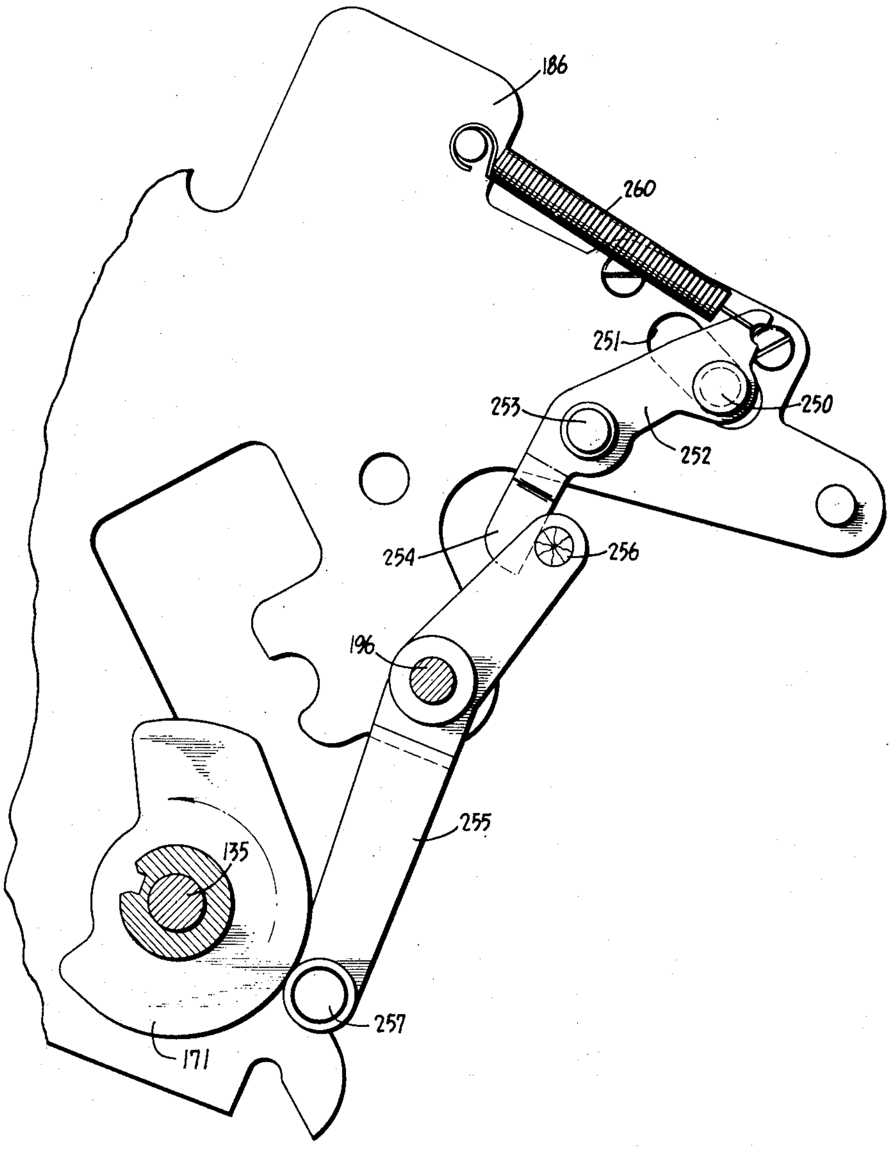
FIG. 26 is the left side elevational view of the zero foil releasing cam for the printing mechanism and the mechanism operated by this cam.

A latch releasing bail 250, FIG. 26, extends through slots, as indicated at 251, in the intermediate frame plates 186 and 187 and across the upper edges of the forwardly directed arms 244 of the latch levers 238. The bail 250 is supported at its ends in the upper ends of a pair of arms, one of which is illustrated in FIGS. 12 and 26 and designated at 252, pivotally mounted at locations spaced below the bail 250 on the intermediate frame plates 186 and 187, as indicated at 253, of the arm 252 so that the bail 250 can swing forwardly and downwardly and upwardly and rearwardly in the slot 251.

The arm 252, as shown in FIG. 12, is extended downwardly beyond its pivotal mounting 253 upon the intermediate frame plate 186 and is provided at its lower end with a laterally projecting abutment 254. A cam follower lever 255 is pivotally mounted intermediate its length on the transverse shaft 196 and has on its upper end a pin 256 in engagement with the forward side of the abutment 254. At its lower end the lever 255 carries a cam following roller 257, shown in FIGS. 5 and 26, which rides on the peripheral edge of the zero foil cam 171 mounted on the cam shaft 135. The zero foil cam 171 is so shaped that during approximately the first 180° of a machine cycle, during which time the actuator sectors 188 are undergoing their downward stroke, as shown in FIG. 14, a bail 250 is held down in the forwardly directed arms 244 of the latch levers 238, holding the latch lever detent 241 out of engagement with the latching shoulders 237 on the print wheel carrier arms 223. This maintains the latch lever detents 248 out of the notches 220 in the print wheel drive gear hub 219 and frees the drive gears for rotational movement near the end of the first half and beginning of the second half of the machine cycle. While the actuator sectors are being held in their limiting downward positions, the cam follower roller 257, FIGS. 5 and 26, rides into the low portion of the cam 171 and a tension spring 260, connected between the upper end of the bail supporting arm 252 and the machine frame, raises the latch lever bail 250, FIGS. 14 and 26, away from the latch lever arms 244 and thereby conditions the latch levers to move into engagement with the corresponding shoulder 237 under the actuation of the corresponding latch lever springs 246.

The upwardly directed arm 240 of each latch lever 238, has near its upward end, a forwardly directed projection 261, the outer end portion 261' of which is laterally directed to the left, as viewed from the front of the machine, and overlies the like outer end portion 261' of the projection 261 on the next latch lever to the left, this forward extension being omitted from the upwardly projecting arm of the first latch lever at the right-hand end of the assembly. The arrangement is such that if any print wheel drive gear to the left of the first gears at the right-hand end of the assembly is moved away from its old position, all of the latch levers to the right of such drive gear will be held by the zero foil projections 261 out of latching engagement with the corresponding shoulders 237 on the print wheel carrier arms 223 and the print wheels to the right of the indicated drive gear will be free to move in a printing operation. Since the drive gears to the left of the indicated drive gear have not been moved and still have their hub notches 220 in registry with the zero foil latch lever detents 248, and since the latch levers to the left are not restrained by the projections 261, these latch levers to the left of the indicated drive gear will be moved by their springs 246 into latching engagement with the corresponding shoulders 237 to hold the corresponding print wheels against printing movement so that the printing mechanism will not print zeros to the left of the highest order of the numeral entry made into the machine by the keyboard and selection mechanism, as previously explained, unless zero keys are operated to record zeros before the first figure of higher value.

When the actuator sectors have been returned to their upward position at the end of the machine cycle, the bail 250 will have been moved downwardly by the cam 171 to raise all of the latch lever detents 248 out of the corresponding notches 220 in the print drive gear hubs 219 and thereby freeing the print wheel drive gears for rotational movement by the downward stroke of the actuator sectors during the first portion of the next operating cycle of the machine.

Supported on the end plate 23 of the carriage 11, as shown in FIGS. 2 and 9, is a stop arm 5207 which extends toward the right from the end plate 23. The stop arm 5207 extends from an integral apertured side plate portion 5208 secured to the end plate 23 by means of screws 5209 or other suitable fastening means. The stop arm 5207 extends over the rear portions of all but three of the sectors 33 and when in the normal position, shown in FIG. 2, the cut out heel portion 5210 is clear of the extended end portions 5211 of the zero foil latch levers 238. When the carriage 11 is step-by-step operated leftwardly from the position shown in FIG. 2, the stop arm 5207 is moved across the extended end portions 5211 of the zero foil levers 238, the stop arm 5207 being above and relatively close to the extended end portions 5211 of the zero foil levers 238 and being operable to prevent clockwise rotations of the covered zero foil latch levers from the position shown in FIG. 14 and therefore preventing movement of the portions 241 of the zero foil levers 238 over the shoulders 237 of the print wheel assemblies 223. As the carriage 11 progressively moves to the left over the extended end portions 5211 of the zero foil levers 238, it extends over one more zero foil latch lever 238 for each operation of a value key in the adding machine portion of the apparatus and acts as a guard against the operation of each zero foil latch lever covered. The print wheel assemblies associated with the zero foil latch levers 238, guarded by the stop arm 5207, are therefore rendered operable to move toward the platen and print zeros or other figures entered in the adding machine by operation of the manual keys. Values, for example, as "00230" may therefore be entered in the apparatus and the values inclusive of the zeros preceding the value "230" will be printed on the printing record tape on the adding machine and will also appear in code in the perforated tape record produced in the tape perforator portion of the apparatus.

Return of the carriage 11 to the normal position shown in FIG. 2 is effected automatically by operation of a functional key in the adding machine and starting an operating cycle of the adding machine portion of the apparatus, the functional keys, such as the add key, being manually operable to start the cycle and the mechanism for resiliently urging the shiftable carriage 11 to its right-hand position, comprising a bellcrank lever 124 having an arm 126 and a link 127 connecting the distal end of the arm to the left-hand plate 23. A tension spring 130 operates the lever 124 in one direction, and a link 131 extends from a pivot connection 132 to and beyond a power-driven cam shaft 135. A cam 137 on the cam shaft 135 carries a laterally projecting pin 138 engageable with a hook portion provided on the free end portion of the link 131.

The manner in which a driving connection is provided between the actuator sectors 188, the print wheel drive gears 217 and the selector sectors 33 will be described in detail in the next following section dealing with the positive pendant gear transmission mechanism.

3. PRINTING OPERATION, FIG. 14

The lever arm 224 of each print wheel carrier 221 is provided with a rearwardly directed extension or tail portion 263 and a tension spring 264 is connected between the rear end of each rearward extension 263 in the machine frame and is effective, when released, to rock the corresponding print wheel carrier 221 about the shaft 222 in a direction such that the associated print wheel 230 is moved rearwardly to strike the adjacent forward portion of the cylindrical surface of the platen 242.

A bail member, in the form of a rod 265, extends transversely of the machine below the rearward extension 263 of the carrier levers 224 and is supported at its ends in the rearward ends of a pair of bail supporting arms 266 and 267, as shown in FIGS. 14, 23 and 25, respectively. At their forward ends, the arms 266 and 267 are pivotally mounted on a carrier supporting shaft 222 and the arm 266 is provided at a rotation space, somewhat below and forwardly of the bail 265, with a laterally projecting stud 268 which preferably carries a sleeve or roller 269, shown in FIG. 25.

A bellcrank lever combination 270, pivotally mounted at its knee on the axle 218 of the print wheel drive gears 217, has the rearward or distal end of one of its arms 271 underlying the stud carried roller 269. The other arm 272 of this bellcrank lever combination extends downwardly and rearwardly from the shaft 218 and to a location opposite the cam shaft 135 and carries on its lower or distal end a cam following roller 273 which rides on the peripheral edge of the print cam 172, shown in FIGS. 5 and 25.

The print cam 172 is so shaped that during the major portion of the machine cycle, the bail 265, FIG. 14, is supported in its upper limiting position in which it holds the lever extensions 263 upwardly and renders the springs 264 ineffective to move the print wheels 230 toward the platen 242. The cam 172 is provided with a low portion 274 of restricted angular extent into which the cam follower 273 drops during a time interval in which the actuator sectors 188 are retained at the end of their downward stroke, as described above, momentarily moving the bail 265 downwardly away from the bottom edges of the carrier lever extension 263 and conditioning the springs 264 to rock the carriers 221 which have been freed from their associated latch levers 238, in a direction to strike the print wheels 230 against the platen 242. After the free print wheels have been moved to strike the platen 242, they are immediately returned to their home, or full-cycle, position by reason of the limited angular extent of the low portion 274 in the printing cam 172.

A portion of the arm 223 of each print wheel carrier 221 is perpendicularly offset from the edge of the arm and arcuately curved longitudinally to overlie the portion of the corresponding idler gear 226 nearest the platen 242 to provide a dust shield 275 for the idler gear.

When a print wheel carriage 221 is rocked about the shaft 222 to move the corresponding print wheel 230 from its home, or full-cycle, position to its platen engaging position, the teeth of the corresponding idler gear 226 are moved out of mesh with the teeth of the associated print wheel drive gear 217, although they remain in mesh with the teeth of the associated print wheel gear 231. This unmeshing of the idler gear 226 and the drive gear 217 would leave the print wheel free to turn while it is positioned near the platen 242 if some means were not provided to lock the print wheel in its rotational position during this printing movement of the print wheel.

A print wheel locking pawl 278 is pivotally mounted intermediate its length on each print wheel carrier arm 221 by a pivotal connection 279 disposed forwardly of, and somewhat below, the corresponding print wheel axle pin 227. The locking pawl 278 is disposed in substantially upright position at the forward side of the associated print wheel and has on its upper end a hook formation 280, the end of which is double beveled to fit between any two adjacent teeth of the associated print wheel.

*Zero control apparatus switch 5000*

In the present invention, a switch is provided to selectively control the recording, in the tape, of zeros. The switch is identified in the drawings as the switch 5000 and the function of the switch 5000 is to control the operation of the electromagnetic devices 3011 so that when a zero value is put into the adding machine before a figure of greater value, the zero value put into the adding machine will be recorded in the tape record.

The ten-key adding machine portion of the Add Punch apparatus described and shown in the aforementioned patent application, S.N. 469,128, Patent No. 2,861,739, issued November 25, 1958, has a frame plate 14 forming one of the main frame plates of the machine, the frame plate being apertured to accommodate the cam shaft 135 and certain other members required in the adding machine portion of the apparatus. The switch device 5000, in the embodiment of the present invention shown in FIGS. 1, 2, 13, 16, 20, 21 and 22, is spaced from the frame plate 14 and is supported on spaced pillars 5001 and 5002 suitably supported on, and extending from, the frame plate 14, the pillars 5001 and 5002 having threaded portions extending through the apertured side plate 5003 of the switch device 5000 and having nut members 5004 cooperating with the pillars 5001 and 5002 to keep the switch 5000 secured in place on the side of the adding machine portion of the apparatus.

Figure 21:
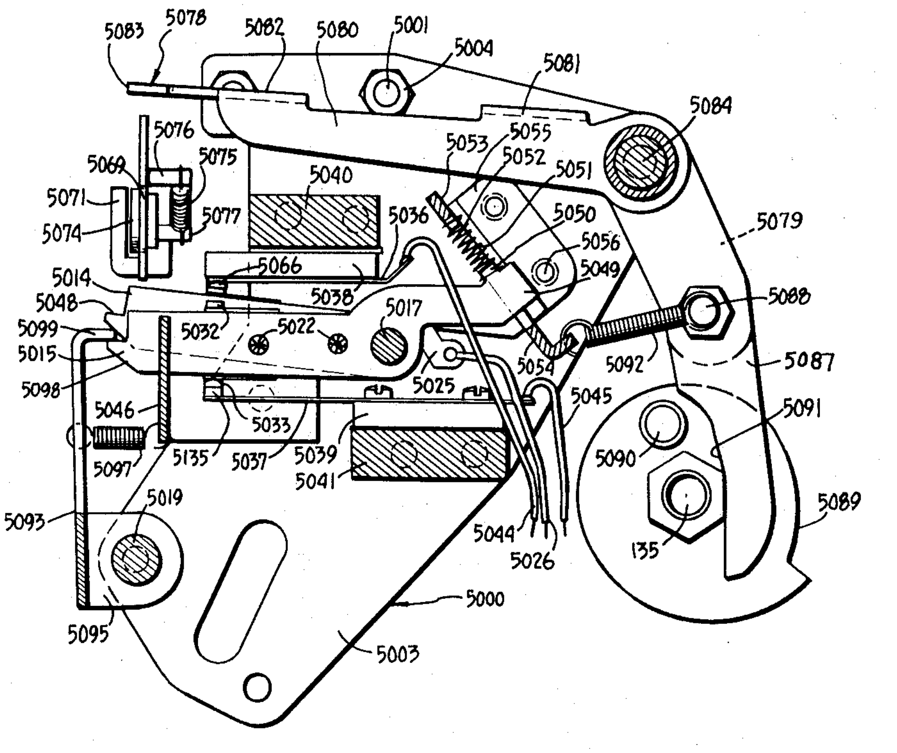
FIG. 21 is a side view, partly in section, of the switch 5000 and taken on the line 21—21 in FIG. 20.
Figure 22:
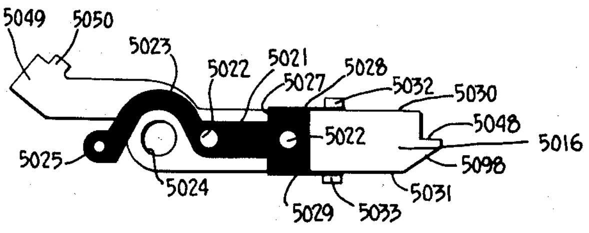
FIG. 22 is a side view of a contact supporting detail with contacts supported thereon and which forms part of the switch 5000.

The switch device 5000 comprises a plurality of movable switch members 5005 to 5015 carrying movable contact pieces which are operable to selectively engage upper and lower fixed contacts in the switch. The movable switch members 5005 to 5015 are arranged in side-by-side spaced relation and represent, in effect, ordinal positions corresponding to the ordinal positions of the ten-key adding machine portion of the apparatus. As shown in FIGS. 21 and 22, each movable member 5005 to 5015, inclusive, comprises an apertured body 5016 of insulating material pivotally supported on a rod 5017, mounted in spaced and apertured frame members 5003 and 5018, which are partially held in assembled and spaced relation by means of the rod 5017 and an internally threaded rod 5019 equipped with screws 5020. Each apertured body 5016 carries a conducting member, such, for example, as the conducting member 5021 shown in FIG. 22, the conducting member 5021 being secured to the apertured body 5016 by virtue of the rivets 5022. The conducting member 5021 has a curved portion 5023 extending partially around the position of an aperture 5024 provided in the body 5016 and operable to receive the rod 5017. The curved portion 5023 terminates in an apertured end portion 5025 to which a lead wire 5026 may be attached, as shown in FIG. 21. A bifurcated end portion 5027 of the conducting member 5021 has leg portions 5028 and 5029 extending over upper and lower edge portions 5030 and 5031, respectively, of the body 5016. The leg portions 5028 and 5029 carry contacts 5032 and 5033, respectively, for engagement with the upper and lower fixed contacts 5066 and 5135, respectively, which are supported on conductor strips 5036 and 5037, respectively, the conductor strips 5036 and 5037 being supported on insulating blocks 5038 and 5039, respectively, mounted on apertured shelves 5040 and 5041, respectively, which extend across the switch structure and are secured to the frame plates 5003 and 5018 by means of screws 5042 and 5043, respectively. Conductor wires 5044 and 5045 may be connected to the conductor strips 5036 and 5037, respectively. The movable switch members 5005 to 5015, inclusive, extend through a comb member 5046 which has drilled and tapped flanges at its ends to accommodate mounting screws 5047 which serve to hold the comb 5046 in position and extending between the frame plates 5003 and 5018. The movable switch members 5005 to 5015, inclusive, are each provided with a lip 5048 on the forward end, and on the rearward end portion of each movable member, an angularly extending block portion 5049 is provided with an upwardly extending lug 5050. The purpose of the lug 5050 is to receive one end of a spring 5051 which, as shown in FIG. 21, is disposed between the movable member and a lug 5052 on an upper comb section 5053 which is assembled with a lower comb section 5054 attached to end brackets 5055 secured to the frame plates 5003 and 5018 by screws 5056 or other suitable fastening means. The lower comb section 5054 serves as a guide and as a stop in one direction for the block portions 5049 of the movable members 5005 to 5015, inclusive, and the upper comb section 5053 serves as a holder for the upper ends of the springs 5051 which normally operate to urge the forward end portions of the movable members 5005 to 5015 upwardly to bring the movable contacts on the movable members 5005 to 5015 into engagement with the upper row of fixed contacts 5057 to 5066, respectively, the normal position of the movable member 5015 being downward, however, and the upper contact 5032 being downward and separated from the corresponding upper fixed contact 5066 and so that the contact 5033, for example, is in engagement with its corresponding fixed contact 5135 on the switch 5000. The normal position of the movable members 5005 to 5014, inclusive, is up, so that the lower of the movable contacts are out of engagement with the lower fixed contacts, and the upper contacts on the movable members 5005 to 5014 are in engagement with the upper fixed contacts 5057 to 5066, respectively.

With reference to FIGS. 1 and 2, when a value key 17 in the keyboard assembly 10 of the ten-key adding machine 1 is operated in the usual manner to enter some value in the apparatus, the selector assembly 11 is moved transversely of the machine one step for each operation of the key, the one step movement taking place simultaneously with the release of the key. The one step transverse movement of the selector assembly 11 occurs also upon operation of the zero key 18. The selector assembly 11 includes a cage having end plates 23 and 24 which are movable with the selector assembly 11 and thus move the distance of one ordinal space each time a value key in the adding machine 1 is operated.

Secured to the end plate 24 in the present invention, is an L-shaped bracket 5067 which travels back and forth relative to the main portion of the switch 5000 and serves as a means for carrying an interponent arm 5068, supporting an interponent pawl 5069 and providing a means for selectively operating the movable members 5005 to 5015 of the switch 5000. The interponent arm 5068 is pivotally supported on the bracket 5067, for example, by means of a screw 5070 extending through the interponent arm 5068 and into the bracket 5067. A portion of the L-shaped bracket 5067 is offset and formed to provide a stirrup 5071 arranged to accommodate and guide a central portion of the interponent arm 5068 which is normally held in an elevated position relative to the base of the stirrup 5071 and upwardly against a stop pin 5072 extending from the L-shaped bracket 5067, the arm 5068 being urged upwardly by means of a spring 5073 supported on the screw 5070 and having one end portion hooked under the lower edge of the L-shaped bracket 5067 and having the opposite end hooked under the lower edge of the interponent arm 5068. The interponent pawl 5069 is pivotally supported on the outer end of the interponent arm 5068 by means of a large headed pin 5074 which extends through an aperture in the interponent pawl 5069 and into the outer end portion of the interponent arm 5068. The interponent pawl 5069 normally extends at right angles to the interponent arm 5068 and is normally retained in this position by virtue of a spring 5075 which extends from the upper portion of the interponent pawl 5069 and diagonally downward to the interponent arm 5068, one end of the spring 5075 being attached to a pin 5077 supported in the interponent arm 5068, while the other end of the spring 5075 is connected to the pin 5076 supported in the interponent pawl 5069. A bail 5078 is provided to apply a downward thrust to the interponent pawl 5069 to bring the interponent pawl 5069 into engagement with a selected one of the movable members 5005 to 5015. Since the selector assembly 11 of the ten-key adding machine moves one step to the left each time a value key 17 or the zero key 18 is operated, and the bracket 5067 of the switch 5000 is attached to the plate 24 of the assembly 11, the interponent pawl 5069 is moved one step to the left, as viewed in FIG. 20, and is in register with one of the movable members 5005 to 5015 of the switch 5000.

The bail 5078 comprises the apertured spaced arm portions 5079 and 5080 connected by the transverse webs 5081 and 5082, the latter of which has an extended forward portion 5083 extending over and in register with the transverse line of travel of the interponent pawl 5069. The bail 5078 is pivotally supported on the rod 5084 which is supported at its ends in boss portions 5085 and 5086 extending inwardly from the frame plates 5003 and 5018, respectively, of the switch 5000. The arm portion 5079 of the bail 5078 is L-shaped and one of its portions extends angularly relative to the main portion and alongside an apertured arm 5087 pivotally supported on the rod 5084. The downwardly extending portion of the arm 5079 and the adjacent portion of the arm 5087 are secured together by means of a bolt 5088, or other suitable fastening means. The lower end portion of the arm 5087, as shown in FIG. 21, is disposed alongside a cam 5089 mounted on a cam shaft 135, shown in FIGS. 5 and 21, respectively. The cam 5089 carries a roller 5090 operable to cyclically engage a curved surface portion 5091 of the arm 5087 and thus operate the bail 5078 against the action of a spring 5092, to swing counterclockwise, as viewed in FIGS. 13 and 21, respectively, so that the forward end 5083 comes downwardly to engage the interponent pawl 5069 and move the interponent pawl 5069 downwardly to cause downward movement of the forward end of one of the movable members 5005 to 5015 of the switch 5000. The spring 5092 is secured at one end to the bolt 5088, and at the other end to the lower comb section 5054. The forward portions of the movable members 5005 to 5015 are disposed in the comb 5046, the function of which is to steady and guide the forward portions of the movable members. A latch member 5093 is provided to latch down the selected one of the movable members 5005 to 5015. The latch member 5093, shown in FIGS. 1, 2, 13, 20 and 21, respectively, comprises an apertured body 5094 with apertured ear portions 5095 and 5096 supported on the rod 5019. The upper portion of the latch member 5093 is normally urged toward the outer end portions of the movable members 5005 to 5015 by means of a spring 5097, one end of which is attached to the apertured web portion 5093' of the body 5094, the other end of the spring 5097 being attached to the apertured lower edge portion of the comb 5046. The upper portion of the latch member 5093 is formed to provide a flange 5099 which extends angularly inward toward the outer ends of the movable members 5005 to 5015 and normally extends over the lip 5048 of one of the movable members 5005 to 5015 to hold the outer end of the last selected one of the movable members 5005 to 5015 downward relative to the other movable members which are normally urged to an upward position by means of the springs 5051. The outer end portions of the movable members 5005 to 5015, inclusive, are formed to provide cam surfaces 5098 operable to bear against the flange 5099 of the latch member 5093 and cam the latch member 5093 outwardly with respect to the outer end portions of the movable members 5005 to 5015, inclusive, when bail 5078 is operated to move the interponent pawl 5069 through its cycle of operation controlled by the cam 5089 carrying the roller 5090.

Figure 20:
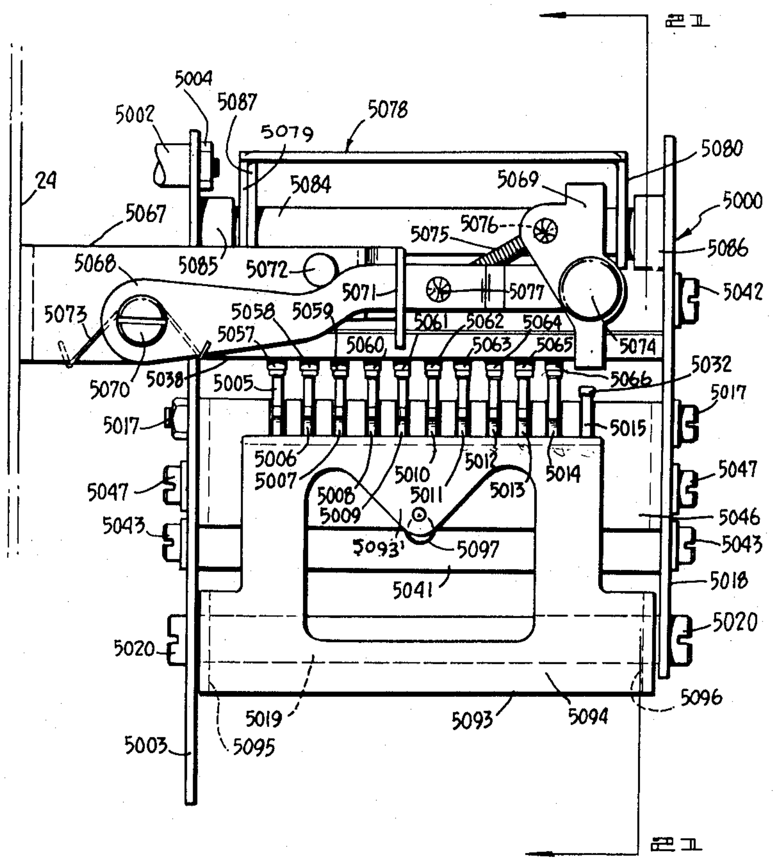
FIG. 20 is a front elevational view of the new and special switch 5000 and taken from the front of FIGS. 1 and 2.

It will be seen that by operation of the keys 17 in the adding machine 1 the selector assembly 11 is moved laterally to the left of the position shown in FIGS. 1 and 2, and that for each key operation the range of movement is one step. Also, that for each lateral movement of the selector assembly 11, there is a corresponding movement of the bracket 5067 of the switch 5000 and therefore a corresponding movement of the interponent pawl 5069. By looking at FIG. 20, it can be seen that a one-step left lateral movement of the bracket 5067 will operate to move the interponent pawl 5069 out of register with the movable member 5015 and into register with the movable member 5014. The movable member 5015 is shown in FIG. 20 as being held down by the latch member 5093 and this is the normal condition of the switch at the end of its cycle of operation. A one-step left lateral movement of the interponent pawl 5069 from the position shown in FIG. 20 will bring the interponent pawl 5069 into register with the movable member 5014, and a subsequent full downward movement of the interponent pawl 5069 will cause the movable member 5014 to cam the latch member 5093 out of latching engagement with the movable member 5015 to release the movable member 5015 for upward movement of its forward end. Release of the latch member 5093 from latching engagement with the movable member 5015 occurs simultaneously with the passing of the outer end of another movable member across the edge of the flange 5099 of the latch member 5093. The range of downward movement of the movable member is sufficient to bring the lip 5048 of a downwardly moving member below the undersurface of the flange 5099 so that the newly selected movable member 5014 will be latched in its lowered position by the latch member 5093 and will remain in this position until another movable member in the group 5005 to 5015 is operated, or until the latch member 5093 is otherwise withdrawn from engagement with the lip 5048 of a movable member. For each cyclic movement of the cam 5089, the bail 5078 is operated to move the interponent pawl 5069 downward to engage and operate whatever movable member in the group 5005 to 5015, inclusive, the interponent pawl 5069 happens to be in register with at the time of operation.

When a movable member of the group 5005 to 5015, inclusive, is in its lower position the movable contact 5021 is out of contact with the corresponding upper fixed contact of the switch, and the movable contact 5021 is in contact with the corresponding lower fixed contact of the switch.

It will be understood that the selector assembly 11 in the adding machine 1 moves to the left upon each operation of a value key and that the selector assembly 11 moves to the right and returns to its home position upon the operation of a function key such, for example, as the add key, total key, etc. Since the bracket 5067 moves along with the movements of the selector assembly 11, the interponent pawl 5069 also moves accordingly.

When a function key, such, for example, as the plus key or total key, in the keyboard assembly 10, is operated, the power switch 139 (SMP) is closed to supply power to the motor 4282 over the circuit as follows: Source of current supply, not shown, conductor 4283, conductor 4283′, motor 4282, conductor 4285, conductor 4285′, centrifugal governor 4286, conductor 4287, conductor 4288, movable contact 4290 and fixed contact 4291 of power switch 139 (SMP), conductor 4292′, conductor 4284 to source of current supply. Upon closing of the power switch 139 (SMP) the adding machine will begin to operate and go through its normal cycle of operation, the cam 5089 being driven one complete cyclic movement of rotation. During this cycle, the roller 5090 on cam 5089 will engage the curved surface 5091 of the lever 5087 and cause the bail 5078 to move downwardly against the action of the spring 5092 to move the interponent pawl 5069 downwardly to cause downward movement of one of the movable members 5005 to 5015, inclusive, the one moved being the one the interponent pawl happened to be in register with at the time of operation of the function key in the adding machine 1.

The movable members 5005 to 5015, as shown in FIG. 16, carry contact members 5100 to 5111, respectively, each of which may be constructed, such, for example, as the conductor member 5021 and with contact points 5032 and 5033, shown in FIG. 22, the movable members 5005 to 5015 being operable to be selectively moved so that the conductor member 5021 will be moved into and out of conducting relation with the corresponding upper and lower contacts, such, for example, as the upper contact 5066, on the conductor strip 5036, shown in FIG. 21, and the lower spring supported contact 5135, and which are representative of the upper contacts 5057 to 5066, inclusive, and the lower spring supported contacts 5122 to 5134, inclusive, shown in FIG. 16, and corresponding to the lower spring supported contact 5135, shown in FIG. 21. The movable contacts 5100 to 5111, inclusive, are operable to be selectively moved downward away from the corresponding upper contacts 5057 to 5066, respectively, and into engagement with the corresponding lower fixed contacts 5122 to 5134, inclusive, there being no need in this case for a lower fixed contact associated with the movable member 5111. Through the operation of the interponent pawl 5069 and the bail 5078, it will be understood that as values are entered in the adding machine the interponent pawl 5069 moves to the ordinal position in which the value is entered. In the first ordinal position, starting with the units portion, the interponent pawl 5069, as shown in FIG. 20, would be in register with the movable member 5015 which would be latched down by the latch member 5093. The movable member 5015, in this particular instance, performs no electrical switching function because, as shown in FIG. 16, there is no corresponding circuit wire connected to the contacts 5111 and 5135. For an entry in the second ordinal position, the interponent pawl 5069 is in register with the movable member 5014 and the bail 5078 is operated to move the interponent pawl 5069 downwardly to move the movable member 5014 downwardly to move the movable contact 5110 out of engagement with the upper contact 5066 and into engagement with the lower contact 5134. In this operation, the movable member 5014 cams the latch 5093 outwardly to release the movable member 5015, and upon return movement of the latch 5093, under the pull of the spring 5097, the latch flange 5099 comes over the lip 5048 of the movable member 5014 and operates to latch the movable member 5014 down. Operation of the adding machine to receive and store a value in an ordinal position, therefore, results in the registering of the interponent pawl 5069 with a correspondingly ordinal positioned movable switch member 5005 to 5015 and the subsequent operation of the movable switch member to remove its contacts from the relatively upper fixed contacts and engagement of the movable contact means with the relatively lower contact means, such, for example, as the contact 5135.

The switch 5000 is interposed between the commutator switch 4101 and the readout switch 4000 and provides a means for selectively controlling the circuit condition between the commutator switch 4101 and the readout switch 4000 and permits the recording in the perforated tape the records of zeros preceding in ordinal positions, figures of higher value.

It will be observed by looking at the electrical system disclosed in the proper assembled arrangement of FIGS. 15, 16, 17 and 18, respectively, that the upper contacts 5057 to 5066, inclusive, in the switch 5000 are in electrical connection with the longitudinal (lower) conductor strips 4061, 4060, 4059, 4058, 4057, 4056, 4055, 4054, 4053, and 4052, respectively, in the readout switch 4000. The movable contacts 5100 to 5110, inclusive, are normally in engagement with the upper contacts 5057 to 5066, respectively, and the movable contacts 5100 to 5110, inclusive, are in electrical connection with the segmental contacts 4322 to 4331, inclusive, respectively, in the commutator switch 4101 through the conductors 4334 to 4343, inclusive, respectively. The segmental contact 4332 in the commutator switch 4101 is in electrical connection with the longitudinal (lower) conductor 4051 in the readout switch 4101 through the conductor 4344.

It will be understood that the Add Punch machine in the aforementioned patent of Harold J. Chall et al., entitled "Perforated Record Making Adding Machine" is provided with zero foils operating to prevent the recording of zeros occurring before a figure of higher value and that zeros occurring after a preceding figure of higher value will be recorded.

In the present invention, zeros may be recorded before a figure of greater value as required. Assuming that it is desired to have the perforated tape contain a record of the figures "004380" and that the zero key has been operated twice for the prefixed zeros, the value keys "4,"

"3" and "8" have been operated followed by an operation of the zero key. As each zero or higher value key is operated the interponent pawl 5069 is moved leftward of the position shown in FIG. 20 so that for the combination of figures "004380" the interponent pawl 5069 finally arrives in register with the movable member 5009 in the ordinal position 7 in the switch 5000, and upon operation of the function key, for example, the plus key, the power switch 139 (SMP) will be closed and the adding machine will operate in its normal manner for a complete cycle, the result being that at the required point in the cycle the bail 5078, FIG. 21, in the switch 5000 will be operated downward by virtue of the rotation of the cam 5089, the engagement of the roller 5090 carried thereby against the curved surface 5091 of the lever 5087 and operating the lever 5087 counter-clockwise, as viewed in FIG. 21, against the pull of the spring 5092. Downward pressure of the interponent pawl 5069 on the movable member 5009 operates to separate the movable contact 5105 from the upper relatively fixed contact 5061 and bring the movable contact 5105 into engagement with the relatively fixed spring supported lower contact 5126. Consequently, under this condition, when the commutator switch 4101 is operating and the wiper contact 3017 extends from the conductor bar 4316 to the segmental contact 4326 the switch 5000 has at this point, in effect, switched out the readout conductor bar 4057 and closed a circuit for operation of the electromagnet 3014 (MP3) of the tape perforator 2 and also closed a circuit for operation of the relay 4440 (KZS). The circuit for operation of the relay 4440 (KZS) may be traced as follows: Rectifier 3144, point 3145, conductor 3147, conductor 3147', fixed contact 3158 and movable contact 3159 of switch 3129 (STC), conductor 3160, fixed contact 3161 and movable contact 3162 of switch 3094 (SLC), conductor 3163, fixed contact 3153 and movable contact 3152 of switch 3151 (SIC), conductor 3164, movable contact 4233, and right-hand fixed contact 4234 of switch 4232, (SVO), conductor 4318, conductor bar 4316 of commutator switch 4101, wiper contact 3017, segmental contact 4326, conductor 4338, movable contact 5105 and fixed contact 5126 of switch 5000, conductor 5139, diode 5159, conductor 5165, conductor 5166, fixed contact 4447 and break contact 4452 of switch 4448 (KZS–A), of relay 4440 (KZS), conductor 5168, winding of relay 4440 (KZS), conductor 5170, conductor 5171 and point 3146 of rectifier 3144. The circuit for operation of the electromagnet 3014 (MP3) may be traced as follows: Rectifier 3144, point 3145, conductor 3147, conductor 3147', fixed contact 3158 and movable contact 3159 of switch 3129 (STC), conductor 3160, fixed contact 3161, and movable contact 3162 of switch 3094 (SLC), conductor 3163, fixed contact 3153 and movable contact 3152 of switch 3151 (SIC), conductor 3164, movable contact 4233, and right-hand fixed contact 4234 of switch 4232 (SVO), conductor 4318, conductor bar 4316, wiper contact 3017 of switch 4101, segmental contact 4326, conductor 4338, movable contact 5105, and fixed contact 5126 of switch 5000, conductor 5176, conductor 5182, diode 5183, conductor 5184', conductors 5184 and 4370, winding of electromagnet 3014 (MP3), conductor 5185, conductor 5171 to point 3146 of rectifier 3144. Operation of electromagnet 3014 serves to selectively operate the tape perporating device 3000 to make a perforation in the tape 3008, the perforation being made in the third position and representing a space signal. The circuit through diode 5183 also forms part of a circuit for the operation of electromagnet 3095 (MPC) which is the operating magnet of the clutch of the tape perforator 3000, the circuit through the clutch magnet 3095 being traceable as follows: Point 3145 of the rectifier 3144, conductor 3147, conductor 3147', fixed contact 3158 and movable contact 3159 of switch 3129 (STC), conductor 3160, fixed contact 3161 and movable contact 3162 of switch 3094 (SLC), conductor 3163, fixed contact 3153 and movable contact 3152 of switch 3151 (SIC), conductor 3164, movable contact 4233, and fixed contact 4234 of switch 4232 (SVO) conductor 4318, conductor bar 4316 and wiper contact 3017 of commutator switch 4101, segmental contact 4326, conductor 4338, movable contact 5105, and fixed contact 5126, conductor 5176, conductor 5182, diode 5183, conductor 5184', conductor 5184, conductor 5186, diode 5187, conductor 5119, conductor 5115, conductor 5189, winding of clutch magnet 3095 (MPC), conductor 5190, conductor 5171 to point 3146 of rectifier 3144. Operation of the clutch magnet 3095 (MPC) operates the clutch 3104 in the tape perforator 2, shown in FIG. 1, and the clutch 3104 transfers power from the pulley 3100 by virtue of the belt drive 3099, to cause rotation of the cam shaft 3004 of the tape perforator 3000.

It will be seen that by suitable operation of the switch 5000 the movable contacts 5100 and 5111 may be switched out of contact with the corresponding upper fixed contacts and into contact with the corresponding lower fixed contacts 5122 to 5129, 5133, 5134 and 5135, respectively. In this case circuits are extended through conductors 5135' to 5144, respectively, and diodes 5155 to 5164, respectively, to conductor 5165. Also conductor paths are provided from the lower fixed contacts to conductor 5182 by way of conductors 5172 to 5181, respectively.

Energization of the winding of relay 4440 (KZS) causes operation of the switches 4448 (KZS–A) and 4441 (KZS–B) to move the movable contacts 4454' and 4030" into engagement with their associated fixed contacts 4452 and 4456', respectively. Closing of the movable contact 4454' against contact 4452 partially provides a circuit for the holding in operation of the relay 4440 (KZS), the circuit being completed through the Off Normal switch 4273 (SONA) and being traceable as follows: Point 3145 of rectifier 3144, conductor 3147, movable contact 4275 of Off Normal switch 4273 (SONA), left-hand fixed contact 4276 of switch 4273, conductor 4454, right-hand movable contact 4454' and make-before-break contact 4452 of switch 4448 (KZS–A), conductor 5168, winding of relay 4440 (KZS), conductor 5170, conductor 5171 to point 3146 of rectifier 3144. Closing of the Off Normal switch 4274 (SON–B) operates to close a circuit for the energization of the motor 4282 as follows: Source of current supply, not shown, conductor 4284, conductor 4292', conductor 4292, conductor 4296, fixed contact 4279 and movable contact 4278 of switch 4274, conductor 4288", conductor 4288', conductor 4288, conductor 4287, governor contacts 4286, conductor 4285', conductor 4285, motor 4282, conductor 4283' and conductor 4283 to source of current supply, not shown.

When commutator switch 4101 moves its wiper contact 3017 into engagement with the segmental contact 4327 the first "0" in the number "004380" will be recorded, it being understood that at this point the readout switch 4000 is in condition to read out the number "004380", the switch 4000 being in such condition that wiper contacts therein are in position to electrically connect the conductor strip 4056 and the conductor strip 4030. The tape perforator 3000 will be operated to record the first "0" through operation of the electromagnetic devices 3013, 3014, and 3016 as follows; and tracing from the conductor bar 4316: Wiper contact 3017, segmental contact 4327, conductor 4339, movable contact 5106 and fixed contact 5062 of switch 5000, conductor strip 4056, and conductor strip 4030 of switch 4000, conductor 4030', movable contact 4030" and left-hand fixed contact 4456' of switch 4441 (in relay 4440 KZS), conductor 4459', conductor 5191, diode 5192, conductor 5193, conductors 4363 and 4364, winding of electromagnetic device 3013 (MP2), conductors 5194 and 5171 to point 3146 of rectifier 3144. Operation of relay 4440 (KZS) causes movement of its movable contact 4030" from engagement with fixed contact 4456 and into engagement with fixed contact 4456' and closes the circuit for operation of the electromagnetic devices 3013, 3014, and 3016 as follows; and tracing from the conductor bar 4316: Wiper contact 3017, segmental contact 4327, conductor 4339, movable contact 5106 and fixed contact 5062 of switch 5000, conductor strip 4056 of switch 4000, the wiper contact serving the conductor strip 4056, conductor strip 4030 in the readout switch 4000, conductor 4030', movable contact 4030'' and left-hand fixed contact 4456' of a switch 4441 (KZS–B), conductor 4459', conductor 5191, diode 5192, conductor 5193, conductor 4363, conductor 4364, winding of electromagnetic device 3013 (MP2), conductor 5194, conductor 5171 to point 3146 of rectifier 3144. For the energization of electromagnetic device 3014 and tracing from conductor 4459', conductor 5195, diode 5196, conductor 5197, conductor 5184, conductor 4370, winding of electromagnetic device 3014 (MP3), conductor 5185, conductor 5171, point 3146 of rectifier 3144; For the energization of electromagnetic device 3016 and starting to trace from conductor 4459', conductor 5198, diode 5199, conductor 5200, conductor 5201, conductor 5202, winding of electromagnetic device 3016 (MP5), conductor 5203, conductor 5171 to point 3146 of rectifier 3144. The operation of the electromagnetic devices 3013, 3014 and 3016 will selectively operate the tape perforator to make perforations in the tape 3008 in the second, third and fifth positions to indicate the registration of a zero figure.

The second zero figure will be recorded when the wiper contact 3017 of the commutator switch 4101 reaches the segmental contact 4328. The wiper contact 3017 serves in this position to extend the electrical circuit from the conductor bar 4316 to the segmental contact 4328 and the circuit continues from there for operation of the electromagnetic devices in the tape perforator by way of conductor 4340, movable contact 5107 and fixed contact 5063 of switch 5000. From thence the circuit continues to conductor 4055, the wiper contact serving the conductor strip 4055 in the readout switch 4000, conductor strip 4030 in the readout switch 4000, conductor 4030', movable contact 4030'', and left-hand fixed contact 4456' of switch 4441 (KZS–B), conductor 4459', conductor 5191, diode 5192, conductor 5193, conductor 4363, conductor 4364, winding of electromagnetic device 3013, conductor 5194, conductor 5171 to point 3146 of rectifier 3144; For the electromagnetic device 3014 and tracing from conductor 4459', conductor 5195, diode 5196, conductor 5197, conductor 5184, conductor 4370, winding of the electromagnetic device 3014 (MP3), conductor 5185, conductor 5171 to point 3146 of rectifier 3144; For electromagnetic device 3016 and tracing from conductor 4459', conductor 5198, diode 5199, conductor 5200, conductor 5201, conductor 5202, winding of electromagnetic device 3016 (MP5), conductor 5203, conductor 5171 to point 3146 of rectifier 3144.

It will be seen, therefore, that the two zeros put into the adding machine by operation of the zero key have been read out from the readout switch 4000 and that perforations have been made in the tape 3008 representing the zeros required to appear before the first figure of greater value.

For the value "4" and in this case, when the wiper contact 3017 in the commutator switch 4101 reaches the segmental contact 4329, a circuit is closed for operation of the electromagnetic devices 3011 in the tape perforator 2 to control the operation of the tape perforator 2 in making a record indicating the value "4." The circuit for operation of the electromagnetic devices in the tape perforator 2 for the value "4" may be traced as follows: Point 3145 in rectifier 3144, conductor 3147, conductor 3147', fixed contact 3158 and movable contact 3159 of switch 3129 (STC), conductor 3160, fixed contact 3161 and movable contact 3162 of switch 3094 (SLC), conductor 3163, fixed contact 3153 and movable contact 3152 of switch 3151 (SIC), conductor 3164, movable contact 4233 and right-hand fixed contact 4234 of switch 4232 (SVO), conductor 4318, conductor bar 4316, wiper contact 3017 and segmental contact 4329 of commutator switch 4101, conductor 4341, movable contact 5108 and fixed contact 5064 of switch 5000, conductor strip 4054, wiper contacts, conductor strip 4034, conductor 4396, conductor 4393, diode 4394, conductor 4395, conductor 4363, conductor 4364, winding of electromagnetic device 3013 (MP2), conductor 5194, conductor 5171 to point 3146 of rectifier device 3144. A branch circuit is also provided for the operation of electromagnetic device 3015 and this circuit may be traced from conductor 4396 as follows: Conductor 4396', diode 4397, conductor 4398, conductor 4399, conductor 4400, winding of electromagnetic device 3015 (MP4), conductor 4401, conductor 5171 to point 3146 on rectifier 3144. A branch circuit is also provided for the operation of the relay 4440 (KZS) which may be traced as follows: From the readout switch 4000, when the wiper contacts are in position to carry the current supply from conductor 4054 to conductor 4034, the circuit extending from thence through conductor 4396, conductor 4471, diode 4472, conductor 4473, conductor 4446', conductor 4446, fixed contact 4447 and break contact 4452 of switch 4448 (KZS–A), conductor 5168, winding of relay 4440 (KZS), conductor 5170, conductor 5171 to point 3146 of rectifier 3144. It will be seen that by operation of the electromagnetic devices 3013 and 3015 that the tape perforator 2 has been prepared for operation to perforate the tape 3008 in the second and fourth positions to form a signal in the tape for the value "4."

In this particular reading, the next number to be recorded in the tape 3008 is for the value "3" and this requires the operation of the electromagnetic device 3012 (MP1). The circuit for operation of the electromagnetic device 3012 (MP1) may be traced as follows: From the conductor strip 4316 and through wiper contact 3017 of commutator switch 4101, segmental contact 4330, conductor 4342, movable contact 5109 and fixed contact 5065 of switch 5000, conductor strip 4053, wiper contacts, conductor strip 4033, conductor 4388, conductor 4389, diode 4390, conductor 4391, conductor 3020, conductor 3021, winding of electromagnetic device 3012 (MP1), conductor 4356, conductor 5171 to point 3146 of rectifier 3144. A branch circuit is also provided for the operation of the relay 4440 (KZS) which may be traced as follows: From conductor strip 4033, conductor 4468, diode 4469, conductor 4470, conductor 4446', conductor 4446, conductor 5166, break contact 4447 and make contact 4452 of make-before-break switch 4448, conductor 5168, winding of relay 4440 (KZS), conductor 5170, conductor 5171, to point 3146 of rectifier 3144. Operation of the electromagnetic device 3012 will prepare the tape perforator 2 for making a perforation in the tape in the first position to represent the value "3."

To represent the value "8" in the next figure, in the one being recorded, the electromagnetic devices 3013 and 3014 must be energized. The circuit for operation of the electromagnetic device 3013 in this case may be traced as follows: From the conductor strip 4316 and thence through wiper contact 3017 of commutator switch 4101, segmental contact 4331, conductor 4343, movable contact 5110 and fixed contact 5066 of switch 5000, conductor strip 4052 in the readout switch 4000, wiper contacts, conductor strip 4038 in switch 4000, shown in FIG. 16, conductor 4425, conductor 4426, diode 4427, conductor 4428, conductor 4363, conductor 4364, winding of electromagnetic device 3013 (MP2), conductor 5194, conductor 5171 to point 3146 of rectifier 3144. For operation of the electromagnetic device 3014, the circuit may be traced from conductor strip 4038, conductor 4425, conductor 4429, conductor 4429', diode 4430, conductor 4431, conductor 5184, conductor 4370, winding of electromagnetic device 3014 (MP3), conductor 5185, conductor 5171 to point 3146 of rectifier 3144. A branch circuit is also provided for the energization of the relay 4440 (KZS) which may be traced as follows: From conductor strip 4038, conductor 4425, conductor 4483, diode 4484, conductor 4485, conductor 4446', conductor 4446, conductor 5166, break contacts 4447 and 4452 of make-before-break switch 4448 (KZS–A), conductor 5168, winding of relay 4440 (KZS), conductor 5170, conductor 5171, to point 3146 of rectifier 3144.

To record the last zero, in the figure we have been recording, it is necessary to energize the electromagnetic devices 3013, 3014 and 3016 in the tape perforator 2 and the circuits for the operation of the devices in this case may be traced as follows: From conductor strip 4316 of the commutator switch 4101, wiper contact 3017, segmental contact 4332, conductor 4344, conductor strip 4051, wiper contacts of readout switch 4000, conductor strip 4030, conductor 4030', movable contact 4030'' and left-hand fixed contact 4456' of double throw switch 4441 (KZS–B), conductor 4459', conductor 5191, diode 5192, conductor 5193, conductor 4363, conductor 4364, winding of electromagnetic device 3013 (MP2), conductor 5194, conductor 5171, to point 3146 of rectifier 3144; For the operation of the electromagnetic device 3014 and tracing from the conductor 4459' and thence by way of conductor 5195, diode 5196, conductor 5197, conductor 5184, conductor 4370, winding of electromagnetic device 3014 (MP3), conductor 5185, conductor 5171, to point 3146 of rectifier 3144. For the operation of the electromagnetic device 3016 and tracing from the conductor 4459' the circuit follows through conductor 5198, diode 5199, conductor 5200, conductor 5201, conductor 5202, winding of electromagnetic device 3016 (MP5), conductor 5203, conductor 5171, to point 3146 of rectifier 3144. It will be seen, therefore, that with the operation of the electromagnetic devices 3013, 3014 and 3016 that the tape perforator has been conditioned for making perforations in the tape in the second, third and fifth positions to represent the value "0."

For each reading cycle calling for operation of the electromagnetic devices 3011 there is an operation of the electromagnetic device 3095 (MPC) to operate the clutch 3104 in the tape perforator 3000. For example, when the conductor strip 4033 in the readout switch 4000 is supplied with energizing current the conductor 3020 is energized over a circuit including conductors 4388 and 4389, diode 4390, conductor 4391 to conductor 3020, from this point the circuit through the electromagnetic device 3095 (MPC) may be traced as follows: Conductor 5112, diode 5113, conductor 5114, conductor 5115, conductor 5189, winding of electromagnetic device 3095 (MPC), conductor 5190, conductor 5171 to point 3146 of rectifier 3144; When the conductor strip 4038 is energized a circuit through the electromagnetic device 3095 (MPC) extends through conductor 4426, diode 4427, conductor 4428, conductor 4363, conductor 51116, diode 5117, conductor 5118, conductor 5115, conductor 5189, winding of electromagnetic device 3095 (MPC), conductors 5190 and 5171 to point 3146 of rectifier 3144. When the conductor strip 4038 is energized, one circuit through the electromagnetic device 3095 may be traced through conductor 4425, conductor 4429, conductor 4429', diode 4430, conductor 4431, conductor 5184, conductor 5186, diode 5187, conductor 5119, conductor 5115, conductor 5189, winding of electromagnetic device 3095 (MPC), conductors 5190 and 5171 to point 3146 of rectifier 3144. When conductor 4399 is energized, the electromagnetic device 3095 is energized over a circuit including conductor 5120, diode 5121, conductor 5188, conductor 5115, conductor 5189, winding of electromagnetic device 3095 (MPC), conductors 5190 and 5171 to point 3146 of rectifier 3144. Assuming that the conductor 5201 is energized, the electromagnetic device 3095 (MPC) would be energized over a circuit extending by way of conductor 4369, diode 5169, conductor 5034, conductor 5115, conductor 5189, winding of electromagnetic device 3095 (MPC), conductors 5190 and 5171 to point 3146 in rectifier 3144.

In some cases, in making records of the values put into, or otherwise obtained, in the adding machine portion of the apparatus and read out therefrom into the tape perforator, it is necessary or advantageous to have the tape perforator make a record of the character of the value read out from the adding machine. For example, the value may be an amount to be added, not added, subtracted, a total, a minus total, a subtotal or a minus subtotal. In the adding machine, therefore, there may be in accordance with the invention disclosed, special keys in the keyboard to indicate the character of the values to be recorded. The keys, for example, would be such as listed and be operable to control the adjustment of a sector gear, such, for example, as the sector gear 33, which will, in turn, control the setting of a sector (actuator) gear, such as a sector (actuator) gear 188 and operable to control the movement of the contact-carrying carriage in the read out switch 4000, shown in FIGS. 1 and 16. The wiper contacts are operable to be moved in the space between the contact bearing strips 4001 and 4002, carrying the conductor strip 4455 and the segmental contact 4030+, 4031N, 4032—, 4033T, 4034$\overline{\text{T}}$, 4035S and 4036$\overline{\text{S}}$, and so that when the read out switch 4000 is closed, one wiper contact will be in contact with the conductor strip 4455 on the contact bearing strip 4002, and the other wiper contact will be in contact with one of the segmental contacts 4030+, 4031N, 4032—, 4033T, 4034$\overline{\text{T}}$, 4035S and 4036$\overline{\text{S}}$, the particular position of the wiper contacts relative to the segmental contacts 4030+, 4031N, 4032—, 4033T, 4034$\overline{\text{T}}$, 4035S and 4036$\overline{\text{S}}$, being in accordance with the key operated in the adding machine 1. When the wiper contact 3017 in the commutator switch 4101 reaches the segmental contact 4333, a record will be made in the tape by the tape perforator, indicating the reading of the position of the wiper contact with respect to the positioning of the wiper contact on one of the relatively fixed segmental contacts 4030+, 4031N, 4032—, 4033T, 4034$\overline{\text{T}}$, 4035S and 4036$\overline{\text{S}}$.

For an adding operation, the plus key in the adding machine would be operated to start the adding machine in its cycle of operation and cause movement of the wiper contact to the segmental contact 4030+. Closure of the read out switch 4000 in this position will provide operating circuits for the electromagnetic devices 3012 and 3015, the circuits being by way of conductor strip 4316, wiper contact 3017 and segmental contact 4333 in commutator switch 4101, conductor strip 4455, wiper contacts and segmental contact 4030+ in read out switch 4000, conductor 4013, diode 4014, conductor 4015, conductors 3020 and 3021, winding of electromagnetic device 3012, conductor 4356 and conductor 5171 to point 3146 of rectifier 3144. For the operation of the electromagnetic device 3015, the circuit in this case, branches off from conductor 4013 and extends through conductor 4017, diode 4018, conductor 4019, conductors 4399 and 4400, winding of electromagnetic device 3015, conductors 4401 and 5171 to point 3146 of rectifier 3144. The electromagnetic device 3095 (MPC) is also operated, in this case, over circuits extending through conductor 4013, diodes 4018 and 4014, in parallel, conductors 4399 and 3020, in parallel, conductors 5112 and 4369, diodes 5113 and 5169 and conductors 5114 and 5034, in parallel to conductors 5115, 5189, winding of electromagnetic device 3095 (MPC), conductors 5190 and 5171 to point 3146 of rectifier 3144.

For a "non-adding" operation, and the starting thereof by operation of the "Print Only" key 4304, the wiper contact of the readout switch 4000 would be brought into position for engagement by the segmental contact 4031N when the readout switch 4000 is closed. Under this condition, closing of the readout switch 4000 will provide a circuit for operation of the electromagnetic device 3013 (MP2), the circuit extending through the commutator switch 4101 by way of the wiper contact 3017 and segmental contact 4333 and thence through the read out switch 4000 by way of the conductor strip 4455, the wiper contacts and segmental contact 4031N, conductor 4020, conductors 4363 and 4364, winding of electromagnetic device 3013 (MP2), conductors 5194 and 5171 to point of contact 3146 of rectifier 3144. In this case, the circuit for operation of the electromagnetic device 3095 (MPC) for controlling the clutch of the tape perforator would extend from conductor 4020 to conductor 4363, conductor 5116, diode 5117, conductor 5118, conductors 5115 and 5189, winding of electromagnetic device 3095 (MPC), conductors 5190 and 5171 to point 3146 of rectifier 3144.

For a "minus" operation, the wiper contact would engage the segmental contact 4032— and complete a circuit for the operation of the electromagnetic device 3015 (MP4) over conductors 4021, 4399, 4400, winding of electromagnetic device 3015 (MP4), conductors 4401 and 5171 to point 3146 of rectifier 3144. In this case, the circuit for operation of the electromagnetic device 3095 (MPC) for controlling the clutch of the tape perforator would extend from conductor 4021 to conductor 4399, conductor 5120, diode 5121, conductors 5188, 5115 and 5189, winding of electromagnetic device 3095 (MPC) and conductors 5190 and 5171 to point 3146 of rectifier 3144.

For a "total" operation, the wiper contact would be on segmental contact 4033T and the electromagnetic devices 3012, 3014 and 3015 would be operated over circuits extending through the read out switch 4000, segmental contact 4033T, conductor 4022, diode 4023, conductors 4023′, 5184, 4370, winding of electromagnetic device 3014 (MP3), conductors 5185 and 5171 to point 3146 of rectifier 3144. For the electromagnetic device 3015, the circuit branches off conductor 4022 and extends over conductors 4096 and 4097 to diode 4098, conductor 4099, conductors 4399 and 4400, winding of electromagnetic device 3015, conductors 4401 and 5171 to point 3146 of rectifier 3144. For the electromagnetic device 3012 in this case, the circuit branches off conductor 4022 by way of conductor 4096, conductors 4115, 4115′, diode 4115″, conductors 4134, 3020 and 3021, winding of electromagnetic device 3012 (MP1), conductors 4356 and 5171 to point 3146 of rectifier 3144. In this case, the electromagnetic device 3095 (MPC) has three branch circuit portions over which the electromagnetic device 3095 (MPC) may be energized, one is by way of conductors 4023′, 5184, 5186, diode 5187 and conductors 5119 to conductors 5115 and 5189; another is by way of conductors 4096, 4097, diode 4098, conductors 4099, 4399, 5120, diode 5121 and conductors 5188, 5115 and 5189. The third branch circuit is by way of conductors 4096, 4115, 4115′, diode 4115″, conductors 4134, 3020, 5112, diode 5113, conductors 5114, 5115 and 5189 to winding of electromagnetic device 3095 (MPC).

For a "minus total" operation, the electromagnetic device 3095 (MPC) would be energized over the same circuits as in the "total" condition, just previously described, with the exception that the wiper contact would be brought to rest on segmental contact 4034$\overline{T}$ and the circuit would extend through segmental contact 4034$\overline{T}$ and conductor 4193 to conductor 4022.

The segmental contacts 4035S and 4036$\overline{S}$ are not shown as being in circuit connection with any of the electromagnetic devices 3011, but, it will be understood that the segmental contacts 4035S and 4036$\overline{S}$ could be connected by conductors 4135 and 4136, respectively, to any of the electromagnetic devices 3011 to control the operation of the electromagnetic devices to obtain, in the perforated tape, desired records when a predetermined key in the adding machine portion of the apparatus has been operated to make a record that a value read out through the readout switch 4000 is of some particular predetermined character.

Figure 17:
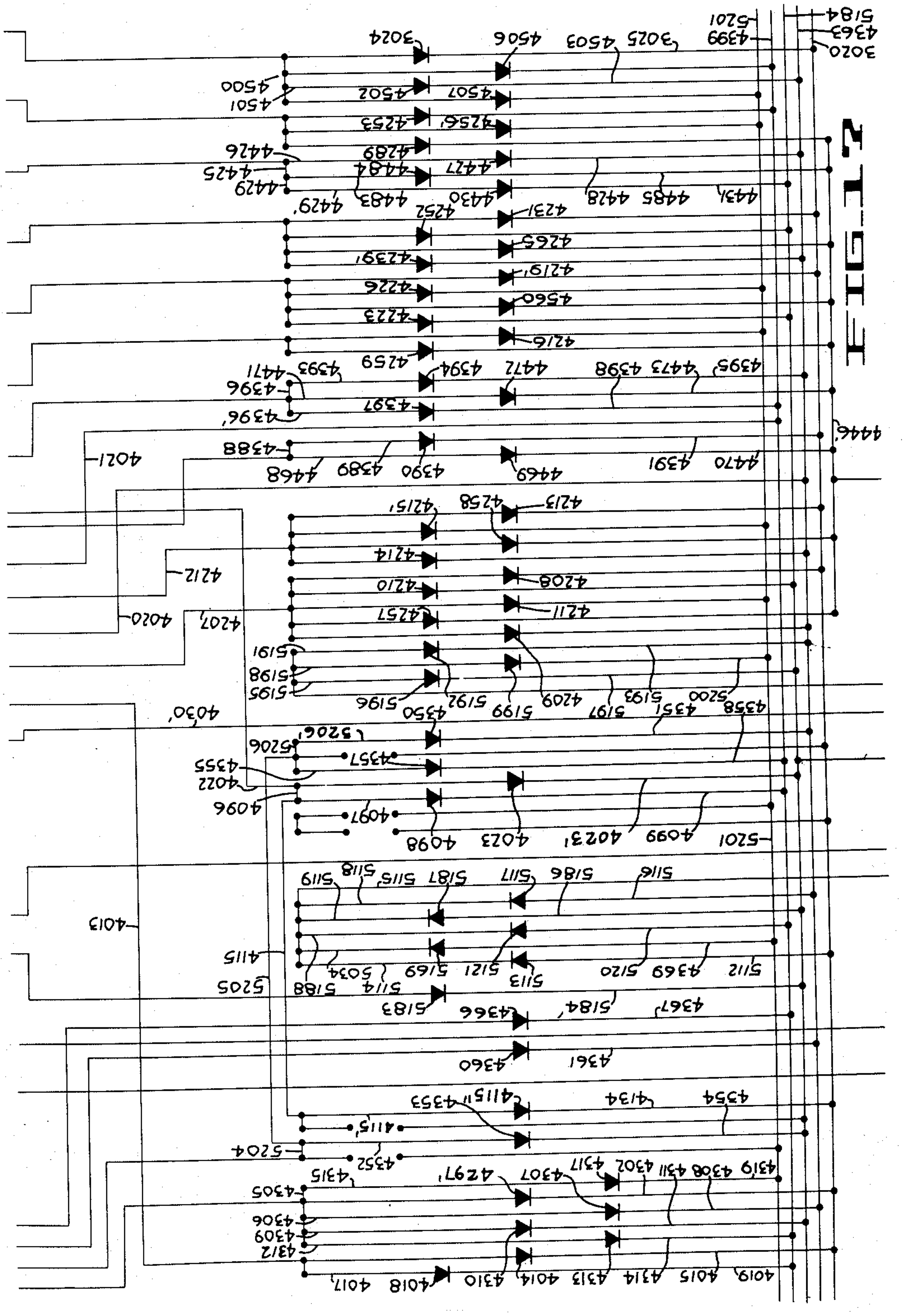
FIG. 17 is a continuation of the circuit diagram shown in FIG. 16 and shows the diode system employed therein.

Recording of the value "004380" has been explained with reference to the schematic showing of the readout switch 4000 and the special switch 5000 arranged in combination, as shown in FIGS. 16 and 17, respectively. For other values, it will be understood that the readout switch will have its wiper contacts on different positions than those already pointed out and that the electromagnetic devices 3011 in the tape perforator 2 will be selectively controlled to produce the required recordings in the tape. For example, when a wiper contact in the readout switch 4000 is in engagement with the conductor strip 4031 and the readout switch 4000 is closed, the electromagnetic devices 3012, 3013, 3014 and 3016 are energized over conductor 4207 and branch circuits including diodes 4208, 4209, 4210, 4211 and conductors 3020, 4363, 5184 and 5201, respectively.

When a wiper contact in the readout switch 4000 is in engagement with the conductor strip 4032 and the readout switch 4000 is closed, the electromagnetic devices 3012, 3013 and 3016 are energized over conductor 4212 and branch circuits including diodes 4213, 4214, 4215′ and conductors 3020, 4363 and 5201, respectively.

When a wiper contact in the readout switch 4000 is in engagement with the conductor 4035 and the readout switch 4000 is closed, the electromagnetic device 3016 is energized over a circuit including the diode 4216 and conductor 5201.

When a wiper contact in the readout switch 4000 is in engagement with the conductor strip 4036 and the readout switch 4000 is closed, the electromagnetic devices 3012, 3014 and 3016 are operated over conductor strip 4036 and branch circuits involving the diodes 4219′, 4223 and 4226.

When a wiper contact in the readout switch 4000 is in engagement with the conductor strip 4037 for the value of "7" and the readout switch 4000 is closed, the electromagnetic devices 3012, 3013 and 3014 are operated over conductor strip 4037 and branch circuits including diodes 4231, 4239′, 4252 and conductors 3020, 4363 and 5184, respectively.

When a wiper contact in the readout switch 4000 is in engagement with the conductor strip 4039 for the value "9" and the readout switch 4000 is closed, the electromagnetic devices 3015 and 3016 are energized over conductor strip 4039 and branch circuits including diodes 4253, 4256′ and conductors 4399 and 5201, respectively.

For the values "1" to "9," inclusive, there is provided a branch circuit for operating electromagnetic relay 4440 (KZS), the branch circuits extending from the conductor strips 4031 to 4039, inclusive, and involving the diodes 4257, 4258, 4469, 4472, 4259, 4560, 4265, 4484 and 4289, respectively, and the branch circuits being in connection with the common conductors 4446′ and 4446 forming a conducting line for the normally closed contacts 4447 and 4452 of switch 4448 (KZS–A) forming a part of relay 4440 (KZS).

Operation of the "Code Void" key 4218 as shown in FIG. 1, will cause movement of the movable contact 4233 from engagement with the fixed contact 4234, FIG. 18, and into engagement with the fixed contact 4235. When the movable contact 4233 is in engagement with the relatively fixed contact 4235, the commutator switch 4101 is switched out of control and the commutator switch 4102 is switched into the system to control the operations of the electromagnetic devices 3011 in making records of a directional character, such, for example, as "LTRS" (Letters) "SPACE," "CR" (Carriage Return) and "LF" (Line Feed). When the wiper contact 3035 of the commutator switch 4102 engages the segmental contact 3037 and the switch 4232 (SVO) has its movable contact 4233 in engagement with the fixed contact 4235, the electromagnetic devices 3012 to 3016, inclusive, will be operated over circuits that may be traced as follows: Point 3145 of rectifier 3144, conductor 3147, fixed contact 3158, and movable contact 3159 of switch 3129 (STC), conductor 3160, fixed contact 3161 and movable contact 3162 of switch 3094 (SLC), conductor 3163, fixed contact 3153 and movable contact 3152 of switch 3151 (SIC), which is a pulse producing switch, conductor 3164, movable contact 4233 and left-hand fixed contact 4235 of switch 4232 (SVO), conductor 4345, conductor bar 3036, wiper contact 3035 and segmental contact 3037 of commutator switch 4102, conductor 4297, diode 4297', conductors 4302, 3020 and 3021, winding of electromagnetic device 3012 (MP1), conductors 4356 and 5171 to point 3146 of rectifier 3144. In this case, the electromagnetic device 3013 (MP2) is energized over a circuit including the conductor 4297, conductor 4305, conductor 4306, diode 4307, conductors 4308, 4363 and 4364, winding of electromagnetic device 3013, conductors 5194 and 5171 to point 3146 of rectifier 3144. For energization of the electromagnetic device 3014, in this case, the circuit is traceable from conductor 4305, conductor 4309, diode 4310, conductors 4311, 5184 and 4370, winding of electromagnetic device 3014 (MP3), conductors 5185 and 5171 to point 3146 of rectifier 3144. The electromagnetic device 3015, in this case, will be operated over a circuit including conductor 4305, conductor 4312, diode 4313, conductors 4314, 4399 and 4400, winding of electromagnetic device 3015 (MP4), conductors 4401 and 5171 to point 3146 of rectifier 3144. For the operation of the electromagnetic device 3016, in this case, the circuit may be traced through conductors 4297, 4305 and 4315, diode 4317, conductors 4319, 5201 and 5202, winding of electromagnetic device 3016, conductors 5203 and 5171 to point 3146 of rectifier 3144.

When the wiper contact 3035 in the commutator switch 4102 engages segmental contact 3038 and the switch 4232 is operated to close its movable contact 4233 against the left-hand fixed contact 4235, the electromagnetic devices 3013, 3014 and 3015 will be energized over circuits including the following: For the electromagnetic device 3013, and tracing from segmental contact 3038, conductors 4320, 5204, 5205, 5206 and 5206', diode 4350, conductors 4351, 4363 and 4364, winding of electromagnetic device 3013 (MP2), conductors 5194 and 5171 to point 3146 of rectifier 3144. For the electromagnetic device 3014, in this case, the operating circuit would extend by way of conductors 4320, 5204, 4352, diode 4353, conductors 4354, 5184, and 4370, winding of electromagnetic device 3014, conductors 5185 and 5171 to point 3146 of rectifier 3144. For the electromagnetic device 3015 (MP4) the circuit would extend by way of conductors 4320, 5204, 5205, 5206 and 4355, diode 4357, conductors 4358, 4399, and 4400; Winding of electromagnetic device 3015 (MP4), conductors 4401 and 5171 to point 3146 of rectifier 3144.

When the switch 4232 (SVO) is operated to close its movable contact 4233 against the left-hand fixed contact 4235, and the commutator switch 4102 is operated to bring its wiper contact 3035 into engagement with the segmental contact 3039 (CR) the electromagnetic device 3013 (MP2) will be energized over a circuit including segmental contact 3039, conductor 4359, diode 4360, conductors 4361, 4363 and 4364, winding of electromagnetic device 3013 (MP2), conductors 5194 and 5171 to point 3146 of rectifier 3144.

When the switch 4232 (SVO) is closed to its left-hand contact 4235 and the commutator switch 4102 is operated to bring its wiper contact 3035 into engagement with segmental contact 3040, the electromagnetic device 3015 is operated over a circuit extending by way of conductor 4365, diode 4366, conductors 4367, 4399 and 4400, winding of electromagnetic device 3015 (MP4), conductors 4401 and 5171 to point 3146 of rectifier 3144.

The switch 5000 enables recording in the tape, records of zeros it is desired to have appear before a record of a higher value is made and it provides this valuable feature without requiring removal of the zero foils now found generally in adding machines of the ten-key type.

During the keyboard clearing cycle of the adding machine, the printing mechanism is restrained from feeding the paper tape on which the figures are printed by the print wheels. This restraint against printing and tape feeding is provided by blocking mechanism in which a rotatable shaft 894, FIG. 25, is secured to an arm 895 having mechanical connection through means of a bifurcated end 896 and a stud 892 with an L-shaped link 891 pivotally connected to a link 421 extending to the shaft 511.

The diodes, such, for example, as the diodes 4506 and 4507 and all like components, shown in FIG. 17, are provided to maintain the direction of current flow in the system and prevent back leakage of pulses. The diodes 3178, 3179, 3180, 3181 and 3182, shown as being connected around the operating coils of the electromagnetic devices 3012, 3013, 3014, 3015 and 3016, respectively, are included in the electrical system for the purpose of providing in each case, a low impedance path for the E.M.F. generated by the collapse of the field around the coil, and serve to smooth out the operating pulses.

In explaining the present invention, and as illustrative of a suitable Add Punch apparatus for employment therein, some of the drawings used in the above-mentioned Harold J. Chall et al. Patent No. 2,861,739, have been used with some slight modifications in the present application. A full explanation of parts shown in the figures in such cases where the parts are common to the present application and the formerly filed application may be found in the above-identified patent.

It is believed by applicants that small modifications may be made in the structure and arrangements of the parts shown and described as illustrative of their invention without departing from the spirit of the invention and that their invention should not be considered as being limited to the particular structure and arrangement of parts shown, but should be limited only in the light of the condition of the art before their invention was conceived.

What is claimed is:

1. In an apparatus for controlling the recording of zero and numerical values in required positions in a record, a plurality of electromagnetic devices arranged in predetermined positions and operable to control the operation of the recording means, a plurality of paired, spaced fixed switch contacts, a plurality of movable switch members arranged in side-by-side relation and operable relative to said fixed switch contacts, movable switch contacts carried by said movable switch members and operable to move out of contact with one of said pair of fixed contacts and into engagement with another of said pair, an electrical system extending to said electromagnetic devices and to said fixed and movable switch contacts, a switch operating arm extending over said movable switch members and operable to selectively operate said movable switch members, means to move said switch operating arm in steps across said movable switch members, and a bail common to said movable switch members and operable to move said switch operating arm into engagement with a selected one of said movable switch members to move its movable contact relative to contacts in said paired spaced fixed contacts.

2. In an apparatus for controlling the recording of zero and numerical values in required positions in a record, recording means operable to make record indications in predetermined positions in a record sheet, a switch having a plurality of paired fixed contacts, a plurality of movable switch members, a plurality of movable contacts supported on said movable switch members and operable between and into contact with said pairs of fixed contacts, an arm operable over said movable switch members, means to operate said arm in step-by-step movements and selectively into register with the movable switch members of said switches and a latch means common to said switches and operable to hold said movable switch members and their contacts in switch closing positions.

3. In an apparatus for recording numerical values in predetermined positions comprising an adding machine, a tape perforator, a readout switch in the adding machine and an electrical control system extending from said readout switch to said tape perforator, a zero controlling switch in circuit connection with said adding machine and said tape perforator, spaced fixed contacts and relatively movable members arranged in positions corresponding with predetermined columnar positions, movable contacts on said movable members and operable to be moved into engagement with one or another of said fixed contacts, an arm operable relative to said movable members, a pawl carried by said arm and operable to selectively engage and move said movable members and a bail spaced from and engageable with said pawl and operable to move said pawl into engagement with one or another of said movable members.

4. In an apparatus for recording numerical values in predetermined positions comprising in combination, a calculating machine, a record making machine, a readout switch in said calculating machine and an electrical control system extending from said readout switch to said record making machine, a zero controlling switch in said electrical control system, said zero controlling switch comprising relatively movable contacts and spaced fixed contacts arranged in positions corresponding with predetermined columnar positions, movable members carrying said movable contacts, an arm operable relative to said movable members, a pawl carried by said arm and operable to selectively engage and move said movable members to move said movable contacts into engagement with one or another of said spaced fixed contacts, spring-biasing means on said pawl and stop means on said pawl for maintaining said pawl in normal position but permitting displacement of said pawl in one direction, a bail spaced from and engageable with said pawl and operable to move said pawl into engagement with said movable members and means to cyclically operate said bail.

5. In an apparatus for recording numerical values in predetermined columnar positions comprising a calculating machine, a record making machine, a selector in said calculating machine operable to selectively enter values in said calculating machine, a carriage in said selector, said carriage being movable column by column as values are entered in said calculator, a readout switch in said calculating machine and operable to set up switch positions in accordance with values entered in said calculating machine, electromagnetic devices in said record making machine operable to control the making of records, a zero controlling switch operable to control the operation of said electromagnetic devices in the recording of zero value indications, sets of relatively movable contacts in said zero controlling switch arranged in columnar positions corresponding to columnar positions in said calculating machine and operable to control the operating circuits of said electromagnetic devices, an arm in said zero controlling switch attached to said carriage and movable over said sets of relatively movable contacts, a pawl on said arm operable to be selectively moved into register with said sets of relatively movable contacts, a bail to move said pawl to operate said relatively movable contacts and means to cyclically operate said bail.

6. A calculating and recording apparatus comprising a calculator, a recorder, a readout switch in said calculator, an electrical system extending from said readout switch to said recorder, a selector in said calculator operable to selectively enter values in said calculator, a carriage in said selector operable to move column by column as values are entered in columnar positions in said calculator, a switch device between said readout switch and said recorder, sets of relatively fixed contacts in said switch device arranged in pairs in columnar positions, movable contacts in said switch device operable into and out of engagement with one or another of the fixed contacts in said relatively fixed contacts, movable members supporting said movable contacts, a pawl operable to be selectively moved into and out of register with said movable members, a bail operable to move said pawl into operative engagement with said movable members, means to operate said bail and an arm supporting said pawl and in mechanical connection with said carriage, said switch device being operable to control said recorder to make records of zeros preceding values of higher than zero when zeroes are entered in said calculator in columnar positions preceding those in which higher values are entered.

References Cited in the file of this patent

UNITED STATES PATENTS

| | | |
|---|---|---|
| 1,976,600 | Carroll | Oct. 9, 1934 |
| 2,084,445 | Kottmann | June 22, 1937 |
| 2,199,547 | Peirce | May 7, 1940 |
| 2,240,549 | Carroll | May 6, 1941 |
| 2,389,571 | Willis | Nov. 20, 1945 |
| 2,487,015 | Bellamy | Nov. 1, 1949 |
| 2,580,693 | Mueller | Jan. 1, 1952 |
| 2,728,521 | Benson et al. | Dec. 27, 1955 |
| 2,737,241 | Doty | Mar. 6, 1956 |
| 2,812,902 | Runde et al. | Nov. 12, 1957 |